(12) United States Patent
Goldberg et al.

(10) Patent No.: US 11,488,239 B2
(45) Date of Patent: Nov. 1, 2022

(54) VIRTUAL FITTING SYSTEMS AND METHODS FOR SPECTACLES

(71) Applicant: Warby Parker Inc., New York, NY (US)

(72) Inventors: David Howard Goldberg, New York, NY (US); Hannah Zachritz, Brooklyn, NY (US); Taylor Alexandra Duffy, New York, NY (US); Sasha Laundy, Los Angeles, CA (US)

(73) Assignee: Warby Parker Inc., New York, NY (US)

( * ) Notice: Subject to any disclaimer, the term of this patent is extended or adjusted under 35 U.S.C. 154(b) by 593 days.

(21) Appl. No.: 16/550,614

(22) Filed: Aug. 26, 2019

(65) Prior Publication Data

US 2021/0065285 A1    Mar. 4, 2021

(51) Int. Cl.
*G06Q 30/06* (2012.01)
*G02C 13/00* (2006.01)
(Continued)

(52) U.S. Cl.
CPC ....... *G06Q 30/0643* (2013.01); *G02C 13/005* (2013.01); *G06T 7/75* (2017.01); (Continued)

(58) Field of Classification Search
None
See application file for complete search history.

(56) References Cited

U.S. PATENT DOCUMENTS 2,818,775 A    1/1958 Ullrich
4,007,990 A    2/1977 McDevitt, Jr. et al.
(Continued)

FOREIGN PATENT DOCUMENTS

DE    19632829 A1    3/1997
DE    102007057260 A1    6/2009
(Continued)

OTHER PUBLICATIONS

Notification of Transmittal of the International Search Report and the Written Opinion of the International Searching Authority, or the Declaration, for PCT/US2019/056827, dated Jan. 22, 2020, 12 pages.

(Continued)

*Primary Examiner* — Ryan M Gray
(74) *Attorney, Agent, or Firm* — Duane Morris LLP

(57) ABSTRACT

Various aspects of the subject technology relate to systems, methods, and machine-readable media for virtual fitting of items such as spectacles and/or spectacle frames. A user interface for virtual fitting may be implemented at a server or at a user device, and utilize three-dimensional information for the user and three-dimensional information for each frame, with frame information stored in a frame database, to identify and/or recommend frames that are likely to fit the user. Fit information can be provided for a group of frames or for each individual frame selected by the user. The fit information can be provided with a static image of the frames and/or within a virtual try-on operation in which the frames are virtually placed on a real-time image of the user.

25 Claims, 19 Drawing Sheets

(51) Int. Cl.
  *G06T 19/00* (2011.01)
  *G06T 7/73* (2017.01)
  *G06T 17/10* (2006.01)
  *G06T 19/20* (2011.01)
  *G06V 40/16* (2022.01)

(52) U.S. Cl.
  CPC ............ *G06T 17/10* (2013.01); *G06T 19/006* (2013.01); *G06T 19/20* (2013.01); *G06V 40/169* (2022.01)

(56) References Cited

U.S. PATENT DOCUMENTS

| | | | |
|---|---|---|---|
| 4,070,115 | A | 1/1978 | Humphrey |
| 4,090,790 | A | 5/1978 | Dragon et al. |
| 4,779,979 | A | 10/1988 | Iwane |
| 5,247,341 | A | 9/1993 | Kurachi et al. |
| 5,307,141 | A | 4/1994 | Fujieda |
| 5,379,111 | A | 1/1995 | Kajino et al. |
| 5,414,505 | A | 5/1995 | Ikezawa et al. |
| 5,489,978 | A | 2/1996 | Okumura et al. |
| 5,521,700 | A | 5/1996 | Kajino et al. |
| 5,621,564 | A | 4/1997 | Kageyama et al. |
| 5,657,710 | A | 8/1997 | Foster et al. |
| 5,682,234 | A | 10/1997 | Kajino |
| 5,684,576 | A | 11/1997 | Kajino et al. |
| 5,855,074 | A | 1/1999 | Abitbol et al. |
| 6,056,633 | A | 5/2000 | Sesena et al. |
| 6,496,253 | B1 | 12/2002 | Vokhmin |
| 6,621,564 | B2 | 9/2003 | Akiyama |
| 6,657,710 | B2 | 12/2003 | Kajino |
| 6,972,837 | B2 | 12/2005 | Kajino |
| 7,209,224 | B2 | 4/2007 | Kajino |
| 7,245,362 | B2 | 7/2007 | Kobayashi et al. |
| 7,609,371 | B2 | 10/2009 | Kajino |
| 7,733,468 | B2 | 6/2010 | Kajino |
| 7,742,158 | B2 | 6/2010 | Divo et al. |
| 8,789,945 | B2 | 7/2014 | Suzaki et al. |
| 9,019,485 | B2 | 4/2015 | Ignatovich et al. |
| 9,228,920 | B2 | 1/2016 | Blonde |
| 9,549,669 | B2 | 1/2017 | Limon |
| 9,778,136 | B2 | 10/2017 | Suzuki et al. |
| 10,036,685 | B2 | 7/2018 | Goldberg |
| 10,321,820 | B1 | 6/2019 | Gollier |
| 10,330,566 | B2 | 6/2019 | Hofmann et al. |
| 11,215,843 | B2 * | 1/2022 | Mendelsohn ............ G02C 5/20 |
| 11,257,143 | B2 * | 2/2022 | Todeschini ............ G06T 19/006 |
| 2012/0105799 | A1 | 5/2012 | Stewart |
| 2013/0088490 | A1 * | 4/2013 | Rasmussen ............ G06T 17/00 345/421 |
| 2015/0055086 | A1 * | 2/2015 | Fonte ................ G02C 13/005 700/98 |
| 2016/0223429 | A1 | 8/2016 | Fecnher et al. |
| 2017/0076523 | A1 | 3/2017 | Rumble et al. |
| 2017/0079523 | A1 | 3/2017 | Limon |
| 2017/0322110 | A1 | 11/2017 | Conrad |
| 2018/0120198 | A1 | 5/2018 | Glasenapp |
| 2018/0224675 | A1 | 8/2018 | Gueu |
| 2018/0268458 | A1 * | 9/2018 | Popa .................... G06Q 30/02 |
| 2019/0072455 | A1 | 3/2019 | Limon |
| 2019/0228448 | A1 * | 7/2019 | Bleicher ............ G06Q 30/0631 |
| 2021/0125405 | A1 * | 4/2021 | Tran .................... G06T 11/001 |
| 2021/0217249 | A1 * | 7/2021 | Sung .................... G06T 7/521 |
| 2021/0327148 | A1 * | 10/2021 | Goldberg ............ G06F 3/0482 |

FOREIGN PATENT DOCUMENTS

| | | |
|---|---|---|
| EP | 0558015 B1 | 10/1997 |
| GB | 1042954 A | 9/1966 |
| WO | 2016/076530 A1 | 5/2016 |
| WO | 2016/181308 A1 | 11/2016 |
| WO | 2016/181309 A1 | 11/2016 |
| WO | 2016/181310 A1 | 11/2016 |
| WO | 2017125902 A1 | 7/2017 |

OTHER PUBLICATIONS

International Search Report and Written Opinion from PCT/US2017/033064 dated Aug. 11, 2017.
Nov. 23, 2020 PCT Notification of Transmittal of the International Search Report and the Written Opinion for PCT International Application No. PCT/US2020/47757.
Apr. 25, 2022 Communication Pursuant to Rules 161(2) and 162 EPC issued by the European Patent Office for European Patent Application No. 20857889.8.
Mar. 1, 2022 PCT International Preliminary Report on Patentability issued by the International Bureau of WIPO for International PCT Application No. PCT/US2020/047757.

* cited by examiner

VIRTUAL FITTING SYSTEMS AND METHODS FOR SPECTACLES

BACKGROUND

Field

The present disclosure generally relates to network-based interfaces, and more particularly to virtual fitting systems and methods for spectacles.

Description of the Related Art

Virtual try-on (VTO) systems have been developed, in which a user of a VTO interface can virtually try on a pair of eyeglasses. In particular, the VTO system can capture streaming images of the user, obtain images of a pair of eyeglasses, and display the images of the pair of eyeglasses overlaid on the streaming images of the user in the VTO interface. In this way, the user is able to see how that pair of eyeglasses would look on their face from several different angles, without having to be in the physical presence of the pair of eyeglasses.

However, it may be desirable to provide improved VTO systems and methods that provide the user with additional information and/or guidance in selecting a pair of eyeglasses for virtual try-on and/or purchase.

SUMMARY

The present disclosure provides a system for virtually fitting of a pair of spectacles, or a frame therefor, to a particular user's face. The user can also be provided with the ability for Virtual Try-On (VTO) of the frame, before, during, or after the fitting. The disclosed systems and methods allow a user of a fitting and/or VTO interface to determine, without having access to the physical spectacle frames, which of tens, hundreds, or thousands of spectacle frames are likely to fit the user's face, and to determine how the spectacle frames will look on their face.

In the disclosed systems and methods, a set of facial landmarks and measurements that have been predetermined to be relevant to optical and sunglasses frame fit are obtained for the user, using three-dimensional location information received from the user's own device. This set of facial landmarks and measurements is used, along with known features of each spectacle frame, to identify a set of frames that are likely to fit that particular user. This set of frames can be provided to the user as a suggested set of frames for virtual try-on, and/or fit information for each frame selected for try-on can be provided with the VTO interface.

This combination of fit guidance and VTO systems allows a user to understand which frames will fit their face, and to preview the virtual frame on a real-time image of their face. In the disclosed systems and methods, when VTO operations are also performed, an image of the user is captured by a camera, a virtual representation of the spectacles frames are superimposed on the captured image, and the composite image is presented back to the user, optionally with fit information added or overlaid.

In various operational scenarios, fit guidance and VTO operations can be performed by various combinations of a user's own device, and one or more remote fitting servers (e.g., one or more cloud-based servers that store a database of spectacle frames, and/or one or more cloud-based servers that process user measurements provided from the user's device to generate fit determinations for one or more of the frames in the database). For example, in one operational scenario, a fitting engine that receives frame information from a frame database, receives user measurements from a sensor of the user's device, and generates fit guidance information, can be implemented at a cloud-based server that is in communication with the user device and the frame database via a wired and/or wireless connection. In another example operational scenario, a fitting engine that receives frame information from a frame database, receives user measurements from a sensor of the user's device, and generates fit guidance information, can be implemented on the user's device, so that all fitting operations are performed locally at the user's device. In another example operational scenario, the user's device and one or more fitting servers can cooperate to process frame information, user measurements and/or other information to generate fit guidance information and provide VTO services.

According to some aspects of the present disclosure, a computer-implemented method is provided. The method includes capturing an image of a face of a user; obtaining a three-dimensional model of the user at a time of capture of the image; obtaining a three-dimensional model of a pair of spectacles; determining a size and a position for a virtual representation of the spectacles based on the image, the three-dimensional model of the user at the time of capture of the image, and the three-dimensional model of the pair of spectacles; displaying the virtual representation of the spectacles, with the determined size and at the determined position, overlaid on the image of the face of the user; determining fit information for the pair of spectacles based on the three-dimensional model of the user at the time of capture of the image and the three-dimensional model of the pair of spectacles; and displaying the fit information along with the virtual representation of the spectacles and the overlaid on the image of the face of the user.

According to some aspects of the present disclosure, a computer-implemented method is provided. The method includes receiving, from a user device at a fitting server, a selection of one or more spectacle frames from a plurality of spectacle frames in a frame database associated with the fitting server; obtaining, with the fitting server, facial landmark location information for a user of the user device based on sensor data from a sensor of the user device; obtaining, with the fitting server, frame landmark location information for each of the one or more spectacle frames; generating, with a fitting engine of the fitting server, fit information for each of the one or more spectacle frames based on the facial landmark location information and the frame landmark location information; and providing the fit information for each of the one or more spectacle frames, with the fitting server for display at the user device.

According to some aspects of the present disclosure, a computer-implemented method is provided. The method includes storing, in a frame database, one of a plurality of size categories for each of a plurality of spectacle frames, each size category corresponding to a range of user measurements; obtaining, using a sensor of an electronic device, three-dimensional location information for a user; determining, based on the three-dimensional location information, a user measurement for the user; identifying a corresponding one of the size categories for the user, based on the user measurement of the user and the ranges of user measurements for the size categories; and providing, for display, information associated with a subset of the plurality of spectacle frames, each of the spectacle frames in the subset having the identified corresponding one of the size categories.

According to various aspects of the present disclosure, "size categories" can be labeled categories (e.g., labeled narrow, medium, wide, etc.) that each correspond to a range of frame widths, can be labeled categories (e.g., labeled narrow, medium, wide, etc.) that each correspond to one particular frame width, can be unlabeled groups of frames where each frame in a particular group has a frame width in a range corresponding to that group, can be unlabeled groups of frames where each frame in a particular group has a specific frame width corresponding to that group, or can be labeled or unlabeled groups of frames with other individual frame size attributes or with any of various more complex combinations of frame size attributes.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
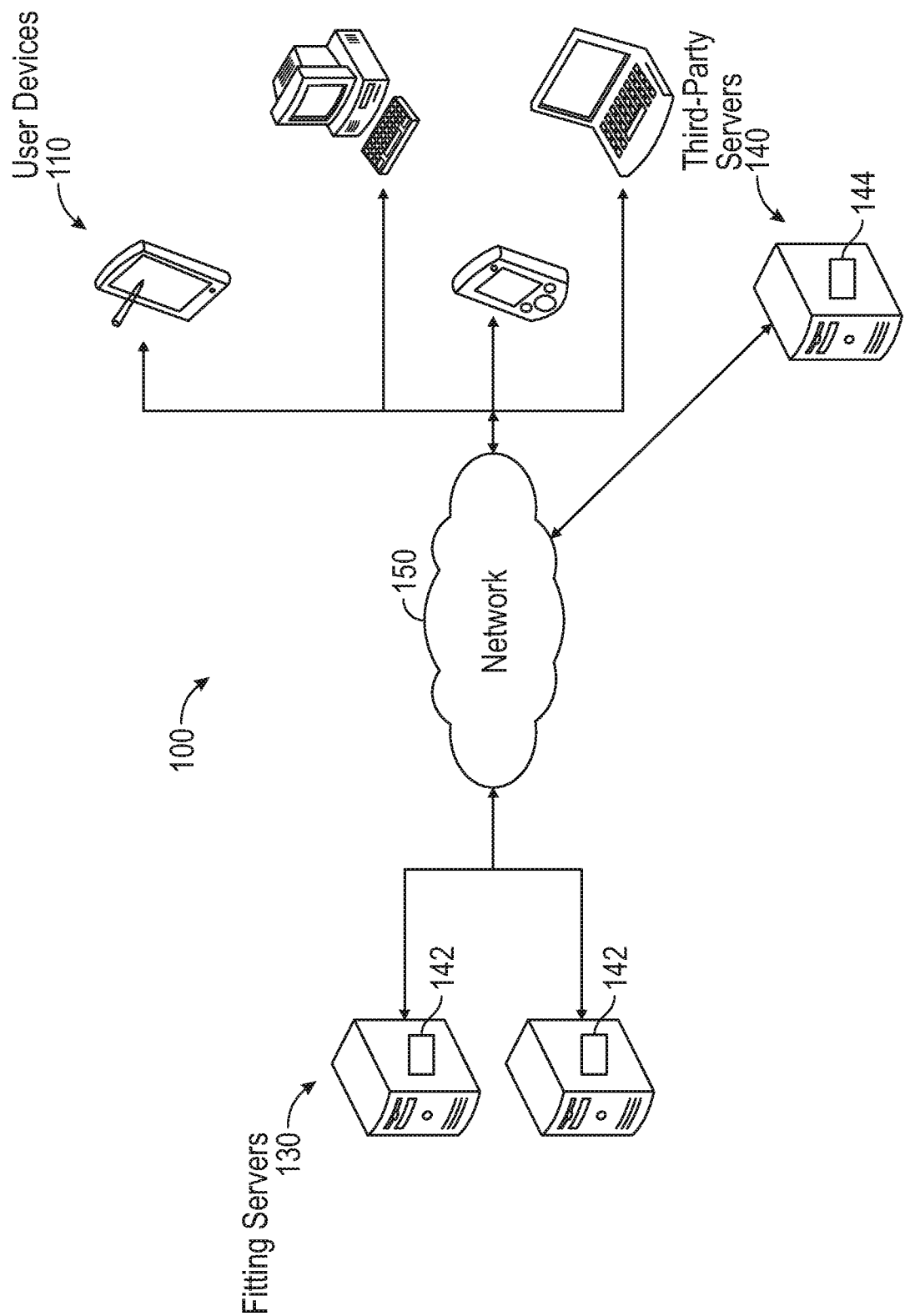
FIG. 1 illustrates an example architecture for virtual fitting, suitable for practicing some implementations of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Virtual fitting and/or try-on systems and methods are disclosed herein. Virtual try-on systems and methods can be particularly useful for viewing of how spectacles or spectacles frames would appear on the face of the user in the real world, without the user having access to the real-world spectacles or frames. This can allow the user to find and/or purchase frames that are visually pleasing to the user. However, what is visually pleasing to the user is not always the right fit for the user. This can be particularly important when prescription lenses are to be mounted in the frames.

For example, a user may select frames that look appealing, but for which the center of the lens is unacceptably offset from the center of the user's pupil in a way that can be detrimental to the user's vision. In some implementations, fit information accumulated over time by potentially thousands of eyewear professionals, with regards to function and form, can be provided to a statistical model of a fitting server, to train the model to identify frames that fit for each particular user of the fitting server. In this way, a user operating their own device (e.g., that is in communication with the fitting server and/or includes software for implementing a fitting algorithm incorporating the trained model) can simultaneously benefit from the accumulated fit knowledge of these thousands of professionals. The virtual try-on (VTO) capabilities can also allow the user to virtually try on frames before and/or after fit recommendations have been provided.

Fit attributes that can be parameterized in a fitting engine, such as a model-based (e.g., machine learning) engine or a rules-based engine, can include the horizontal and/or vertical offset distances between the centers of the user's pupils and the centers of the lenses, offsets between the side of the user's face and the outer edge of the lens, offsets between the top of the frame and the user's eyebrows, offsets between the user's cheeks and the bottom of the frame, and interface angles and/or positions between the frame and the user's nose (as examples).

The facial landmarks for each user can be identified using three-dimensional sensors of the user's device and/or computed using data from the three-dimensional sensors. The physical landmarks of each frame can be stored in a frame database, along with images, models, colors, shapes, materials, bridge features, fashion categories, prices, or the like.

Further, users may have trouble judging what is "visually pleasing", and may want support in making this judgement in some operational scenarios. For example, a fitting and/or VTO application running on the user's device can operate sensors of that device to scan a customer's face, and can recommend glasses that the user might find visually pleasing, in addition to, or separate from, fit recommendations as described herein.

Although many examples provided herein describe a user's device or physical features as being identified and/or stored, each user may grant explicit permission for such user information to be collected, shared, and/or stored. The explicit permission may be granted using privacy controls integrated into the disclosed system. Each user may be provided notice that such user information will be stored with explicit consent, and each user may at any time end having the information stored, and may delete any stored user information. The stored user information may be encrypted to protect user security. Although some embodiments described herein may benefit from temporary storage of a user's biometric data on a remote server in accordance with any and all applicable state and/or federal regulations, in general a user's biometric data is stored and processed only on the user's device, and is discarded once a current fitting and/or VTO session concludes.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for virtual fitting and/or try-on of spectacles, suitable for practicing some implementations of the disclosure. The architecture 100 includes fitting servers 130 and user devices 110 connected over a network 150. As shown, third-party servers 140 may also be communicatively coupled to fitting servers 130 and/or user devices 110 via network 150. Fitting servers 130 may include databases 142 of information associated with objects that can be virtually fit and/or tried-on with one or more of user devices 110. For example, databases 142 of fitting servers 130 may include three-dimensional models of various pairs of spectacles frames, with or without lenses, that are available for purchase (e.g., from the fitting server itself, from a physical brick-and-mortar store, or from another server such as third-party server 140). In some implementations, fitting servers 130 may also store code that, when executed by a processor of the server, causes the processor to provide an interface (e.g., a fitting and/or try-on web interface) that performs the fitting and/or try-on methods and operations described herein. In some implementations, the code for the interface and/or the database of spectacle frames may also, or alternatively, be stored at one or more of user devices 110. In these implementations, a user device running a fitting and/or try-on interface (e.g., generated by a fitting and/or try-on application running on the user device) may obtain the three-dimensional models of the spectacles from local storage at the user device and/or from fitting servers 130, and may perform fitting and/or try-on operations as described herein at the user device.

Third-party servers 140 may include servers that handle sales of the spectacles for which the three-dimensional representations are stored at fitting servers 130, or third-party servers 140 may store three-dimensional representations of other objects that can be tried on using the interface provided by fitting servers 130 and/or user devices 110 (e.g., by storing three-dimensional models of the other objects in a database 144) and providing the three-dimensional models to fitting servers 130 and/or user devices 110.

Fitting servers 130 can each be implemented with any device having an appropriate processor, memory, and communications capability for hosting a fitting and/or try-on interface and/or for storing three-dimensional models of spectacles or other objects. User devices 110 can be, for example, desktop computers, mobile computers such as laptop computers, tablet computers (e.g., including e-book readers), mobile electronic devices (e.g., a smartphone, tablet, or PDA), or any other devices having appropriate imaging (e.g., visible-light imaging and/or infrared imaging), illumination (e.g., visible light illumination and/or infrared light illumination), processor, memory, and communications capabilities for providing a virtual try-on interface. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Interface

Figure 2:
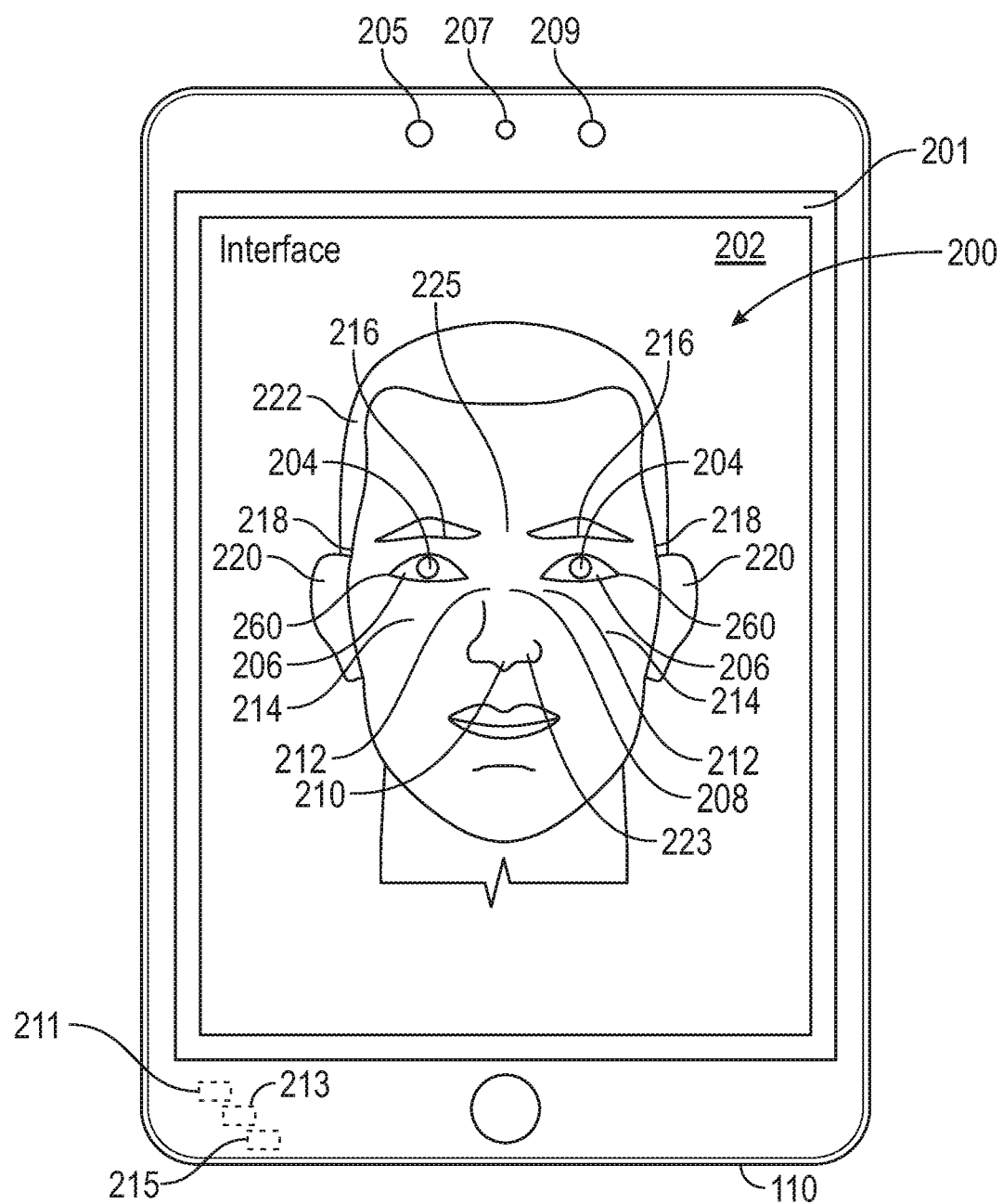
FIG. 2 is a schematic diagram illustrating an interface with fit guidance, according to certain aspects of the disclosure.

FIG. 2 is a schematic diagram illustrating an interface 202 running on one of user devices 110. Interface 202 (e.g., a fitting and/or VTO interface) may be a web interface based on code being executed at a remote device such as one of fitting servers 130, or may be a local fitting and/or try-on application running on the user device itself In the example of FIG. 2, an image 200 of a user has been captured (e.g., using a visible light camera 205 of the user device 110) and is displayed with a display 201 of the user device 110. It can be seen that various features of the user's face can be identified in image 200. For example, the user's eyes 206, nose 223, and hair 222 can be seen and identified in image 200 by user device 110 and/or fitting servers 130. More detailed features such as the user's sellion 208, pupil centers 204, otobasion superius 218 (e.g., representing also the outer edge of the user's face), orbitale superius 216 (e.g., representing also the location of the user's eyebrow), glabella 225, the outer edge 260 of the user's eye 206, and/or pronasale 210 can also be seen and identified by user device 110 and/or fitting servers 130. Other facial landmarks that can also, or alternatively, be seen and identified in image 200 by user device 110 and/or fitting servers 130 include the user's endocanthion, exocanthion, tragion, zygion, palpebrale superius, palpebrale inferius, frontotemporale, maxillofrontalle, orbitale, tragion, nasion, and menton (as examples).

However, image 200 may be a two-dimensional image that does not include any information regarding the size and/or absolute location of any of the features of the user in the image. Three-dimensional location information for these and/or other features of the user can be obtained using an additional sensor 209 such as another camera, a motion sensor (e.g., for visual inertial odometry), a proximity sensor, a time-of-flight sensor, a laser range finder, or any other sensor capable of capturing three-dimensional location information for an object in the field of view of camera 205. In one example, sensor 209 may be implemented as another visible light camera that is spatially offset from camera 205 so that parallax information (e.g., a parallax effect between images captured by two stereo imaging cameras 205 and 209) and the known distance between the cameras can provide the three-dimensional location information. In another example, three-dimensional location information can be generated using structure-from- motion operations based on motion of the user relative to camera 205 and/or sensor 209 implemented as a camera.

In another example, sensor 209 may be an infrared camera that captures infrared light from the user's face and/or head such as reflections of one or more infrared beams emitted by an infrared light source 207. For example, infrared light source 207 may emit several (e.g., tens, hundreds, or thousands) of infrared beams that generate infrared spots at various measurement locations on the user's face and/or head, reflected portions of which can be imaged by sensor 209. Distortions of the infrared spots in the captured infrared image can be used, along with the known sizes and shapes of the infrared beams, to determine the absolute distance to each of the infrared spots. Accordingly, sensor 209, whether implemented as a camera or other three-dimensional sensor, allows the absolute size of the user's face and/or various features of the user's face in image 200 to be determined (e.g., by determining the distances between the absolute three-dimensional locations of various measurement locations with corresponding features in image 200).

User device 110 (and/or fitting servers 130) may generate and/or store three-dimensional location information for the user such as measurement point absolute three-dimensional locations 211 (e.g., measurement point locations expressed in physical units, such as millimeters, in a camera-centered coordinate system, where three-dimensional (3D) coordinates are expressed relative to the position of the camera of the user's device), a three-dimensional model 213 of the user based on the measurement point absolute three-dimensional locations 211, and/or facial landmark absolute locations 215 (e.g., 3D locations of facial landmarks expressed in physical units, such as millimeters, relative to the position of the camera of the user's device). The three-dimensional location information that is stored is mapped to the two-dimensional locations of corresponding features in image 200. Facial landmark absolute locations 215 suitable for fitting operations can be a subset of measurement point absolute three-dimensional locations 211, may be averaged, interpolated, and/or otherwise combined measurement point absolute three-dimensional locations 211, or can be determined based on three-dimensional model 213. Three-dimensional model 213 may be generated based on measurement point absolute three-dimensional locations 211 or based on facial landmark absolute locations 215 that have been extracted or generated from measurement point absolute three-dimensional locations 211. In various implementations, three-dimensional model 213 and/or facial landmark absolute locations 215 may be generated at user device 110 or at fitting servers 130 using data (e.g., measurement point absolute three-dimensional locations 211) provided by user device 110 to the server.

Figure 3:
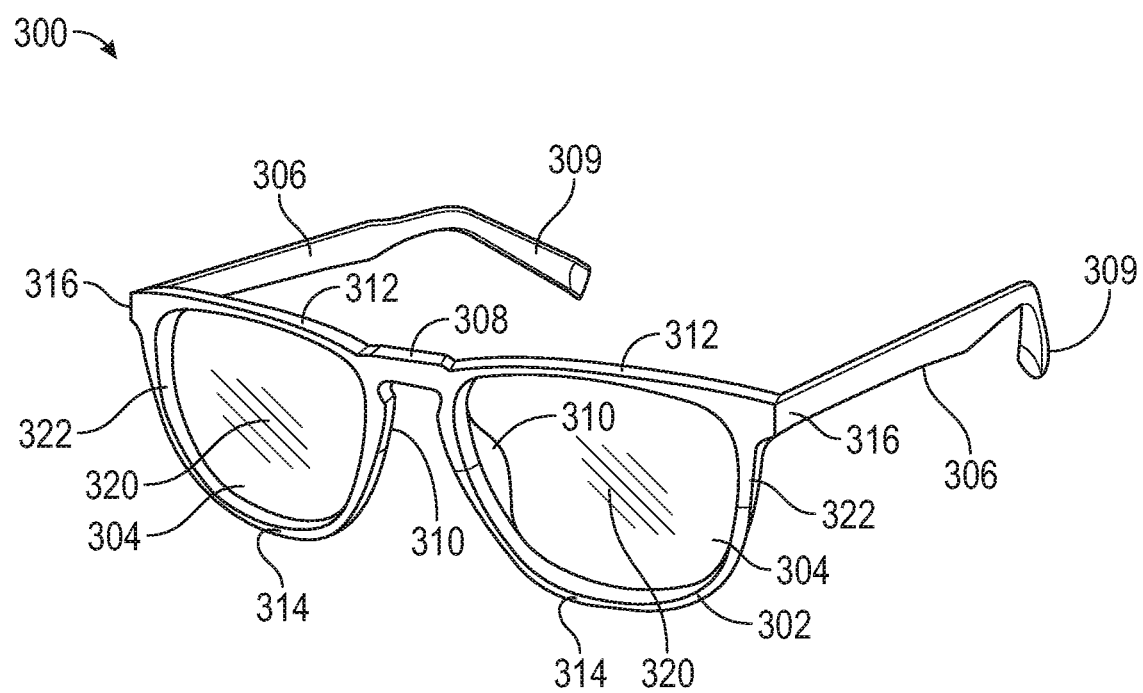
FIG. 3 illustrates an example pair of spectacles, according to certain aspects of the disclosure.

The user represented in image 200 may desire to try on and/or determine the fit of an object to which the user does not have physical access, such as spectacles 300 of FIG. 3. As shown in FIG. 3, spectacles 300 include physical features such as frame 302 and lenses 304 mounted in the frame.

Frame 302 includes a bridge 308, nose pads 310, temples 306, end pieces 316, and temple tips (earpieces) 309. Nose pads 310 can be built to the frame (e.g., for acetate frames) or may be separate pads that are disposed on pad arms (e.g., adjustable arms) that extend from the frame (e.g., for metal or mixed-material frames).

Various portions of frame 302 and/or lenses 304 can be frame landmarks that are used to determine the fit of the frame for a particular user. For example, the locations of lens centers 320 can be compared with the locations of the pupil centers 204 of a particular user. As another example, the locations of the outer edges 322 of the lenses 304 (or openings in the frame 302 for the lenses) can be compared with the outer edges 218 of the user's face. As another example, the locations of the upper ends 312 of frame 302 can be compared with the locations of the user's eyebrows 216. As another example, the distance between the pupil centers 204 and the lenses 304 in a direction normal to the user's face can be determined (e.g., to ensure that, for metal frames with nose pads on pad arms, the frames and lenses do not sit too far from the user's eyes (e.g., for optical performance of the lenses)).

Various portions of frame 302 can be points of contact with corresponding portions of a wearer's face, depending on the particular characteristics of that wearer. For example, the bridge 308 commonly rests against the sellion 208 of a wearer for acetate frames with integrated nose pads 310, while the integrated nose pads rest on bridge portions 212 of the user's nose. In another example, for metal frames with nose pads on pad arms, the bridge 308 will float away from the user's skin, or will rest against a relatively higher location on the user (e.g., the glabella 225), with the spectacles primarily supported by contact between nose pads 310 and bridge portions 212 of the user's nose.

With any frame material, lower ends 314 of the frame (e.g., below the lens 304), or the bottom of the lenses 304 in spectacles with rimless or partially rimless frames, may float away from contact with the user, or may rest against the cheeks 214 (e.g., defined by the cheekbone portions of the user's skin). Similarly, with any frame material, portions 312 of the frame above the lens (or top portions of lenses mounted in rimless frames), may float away from contact with the user, or may rest against the eyebrows 216, the orbitale superius, or nearby portions of the user's skin.

Similarly, with any frame material, temples 306 of frame 302 will rest against the outer edges 218 of the user's head at the user's ear (e.g., defined by the location of the otobasion superius) and/or portions of temple tips 309 may rest against portions of the user's head behind the user's ears 220. The points of contact between spectacles 300 and the user's face and head may be symmetric on left and right sides of the user's face and head for users with highly symmetric features, or may be different for users with one or more asymmetric features.

As another example of frame landmarks that can be used to determine the fit of the frame for a particular user, the lower ends 314 of frame 302 can be compared with the locations of the user's cheeks 214 (e.g., to ensure that the user's cheeks won't push up on the lower ends 314 of frame 302 when the user smiles). As another example, the locations and/or angle of nose pads 310 can be compared with the location and/or width of the bridge portions 212 of the user's nose (e.g., to ensure that the frame 302 won't slide down the user's nose when worn). As another example, the locations of end pieces 316 can be compared to the outer edges 218 of the user's face.

The features of spectacles 300 noted in FIG. 3, and/or other features of spectacles 300, are described by a three-dimensional model of spectacles 300 that is stored in a frame database by fitting servers 130 (e.g., for each pair of spectacles that is available for order or purchase).

Three-dimensional models of the user's face and/or head as described herein may include reference points and parameterized mathematical functions with parameters that cause the mathematical functions to connect the reference points along paths that correspond to the contours of the user's face and/or head. Three-dimensional models of the spectacles as described herein may include reference points and parameterized mathematical functions with parameters that cause the mathematical functions to connect the reference points along paths that correspond to the contours of the spectacles. In some scenarios, an integrated three-dimensional model of the user's face and/or head, and the spectacles, can be generated.

As noted above, the fitting operations described herein can be combined with VTO operations to allow a user to view a virtual representation of a particular frame 302 on images of their own face in real time. Once an image 200, the three-dimensional location information for the user in the image (e.g., 211, 213, and/or 215 of FIG. 2), and the three-dimensional model of a particular pair of spectacles 300 have been obtained, a virtual representation of spectacles 300 can be overlaid on image 200 so that the user can see how that particular pair of spectacles 300 would appear in the real world when worn on that user's particular facial features. These VTO operations can be performed before, during, or after generating and providing fit guidance to the user.

Figure 4:
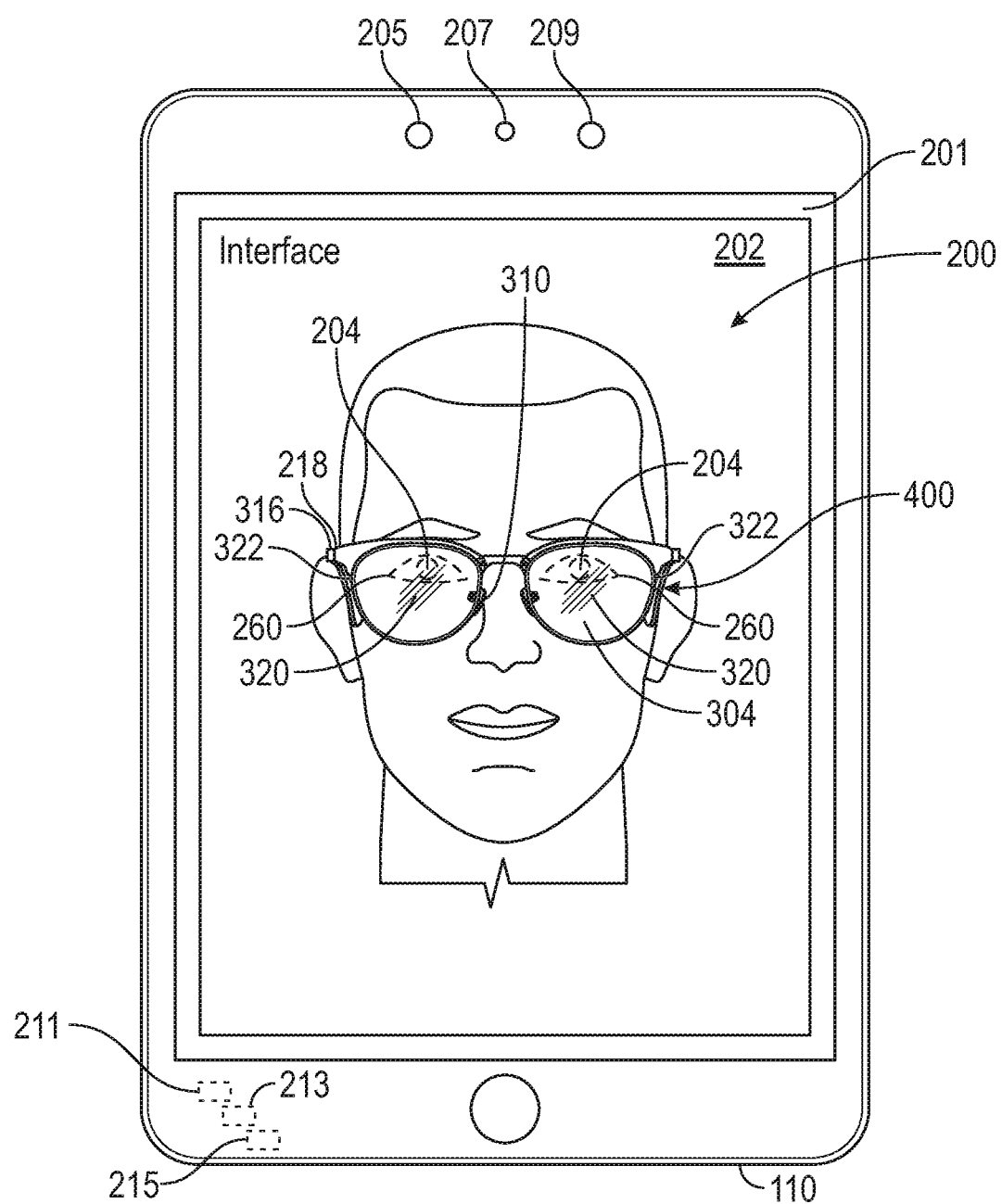
FIG. 4 is a schematic diagram illustrating an interface displaying a virtual representation of spectacles on an image of a user, according to certain aspects of the disclosure.

For example, FIG. 4 illustrates a virtual representation 400 of spectacles 300 that has been sized such that the actual size of spectacles 300, relative to the actual size of the user's face, is accurately represented. In the example of FIG. 4, the virtual representation 400 of spectacles 300 is displayed, overlaid on the image 200, in a configuration in which virtual representation 400 has been positioned and sized relative to the image of the user to appear as spectacles 300 would rest on the user's face in the real world. The position and size of the virtual representation 400 can be determined using an iterative set of intersection operations between a three-dimensional representation (e.g., a 3D set of points and/or a 3D model) of the user's face and a three-dimensional representation (e.g., a 3D set of points and/or a 3D model) of the spectacles 300.

Displaying the virtual representation of the spectacles (with the determined size and at the determined position, overlaid on the image of the face of the user, as in the example of FIG. 4) may include transforming the three-dimensional model of the spectacles into a coordinate system corresponding to the displayed two-dimensional image, determining (e.g., based on the color, size, and shape of the transformed spectacles) a brightness and a color for each pixel in a modified version of the two-dimensional image accordingly so that the virtual representation 400 appears correctly, and operating the display pixels of the display 201 of device 110 to display each of the pixels of the modified image with the determined brightness and color for that pixel.

It should be appreciated that the virtual representation 400 has not been sized to match the apparent size of the user's features in the image, but instead to match the real-world size of the user's features. For this reason, the virtual representation 400 of spectacles 300 may appear oversized or undersized relative to the size of the user's head and face, if the actual spectacles 300 would be oversized or undersized for the user in the real world. For example, if spectacles 300 are an oversized misfit for that particular wearer, virtual representation 400 of spectacles 300 will appear oversized on image 200.

In some implementations, interface 202 can detect the fit quality of spectacles 300. For example, interface 202 may detect a good-fitting (e.g., appropriately sized) pair of spectacles or a poor-fitting (e.g., a poorly sized pair of spectacles) based on the known size of the spectacles and the three-dimensional location information. Interface 202 can alert the user to the good size of the spectacles, or can alert the user to a poor size and/or to identify and/or provide a recommendation of one or more different pairs of spectacles, to try on, that may be more appropriately sized.

Figure 5:
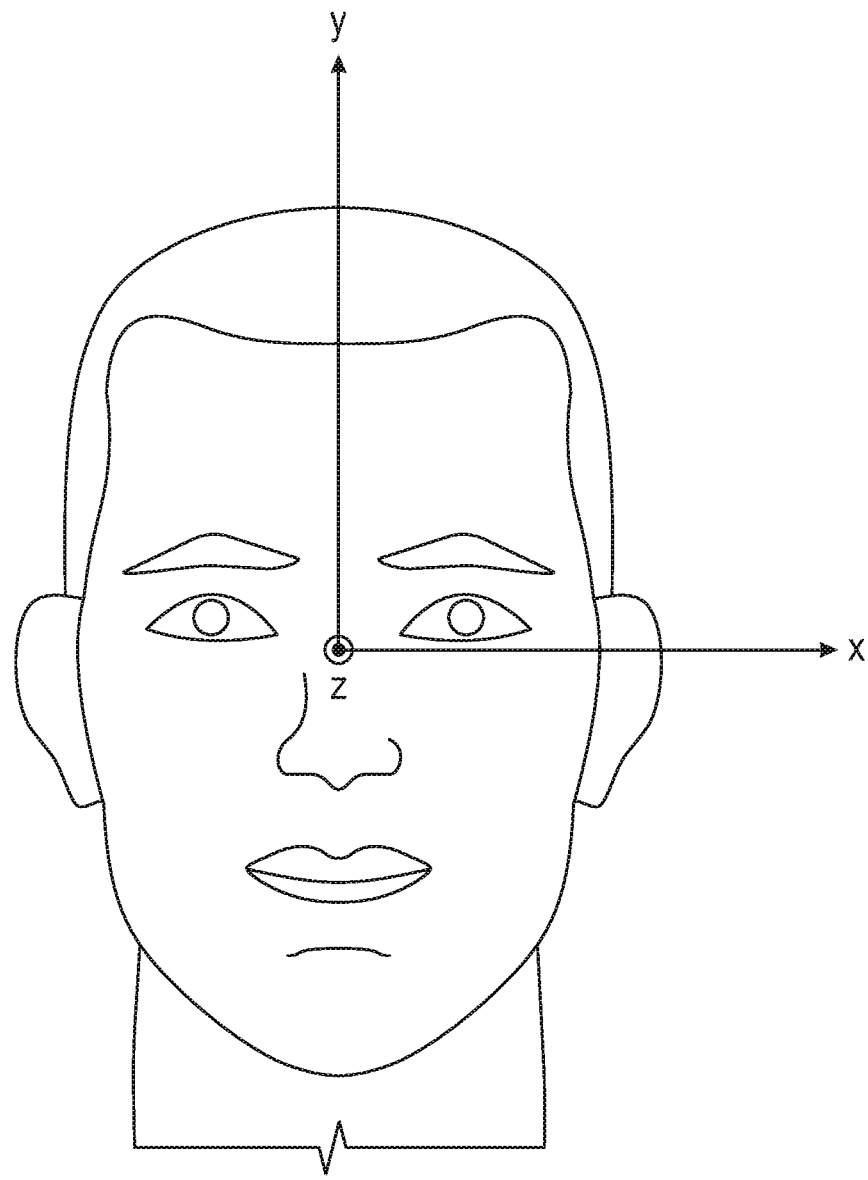
FIG. 5 is a schematic diagram illustrating a facial coordinate system, according to certain aspects of the disclosure.

In order to determine the fit of a particular frame 302 for a particular user's face, fitting servers 130 may designate a facial coordinate system, such as the facial coordinate system shown in FIG. 5. In the example of FIG. 5, the x axis refers to the axis that defines (e.g., extends between) a user's left and right sides, where the positive x axis extends from the origin toward the user's own left side. The y axis in FIG. 5 refers to the axis that defines (e.g., extends between) the top and bottom of the user's head, where the positive y axis extends orthogonally to the x axis from the origin toward the top of the user's head. As shown, the z axis refers to the axis that defines (e.g., extends between) the front and back of the user's head, where the positive z axis extends orthogonally to the x axis and the y axis and from the origin towards the front of the user's head.

The fitting operations may include identifying a facial landmark that serves as the origin of the facial coordinate system. One particularly useful reference point is the sellion 208, which refers to the deepest midline point of the angle formed between the nose and forehead, or the deepest point in the "divot" between the user's eyes. The location of sellion 208 may be identified by user device 110 and/or fitting servers 130 using image 200 and/or the three-dimensional location information for the user. The fitting operations may include identifying an origin of a spectacle coordinate system, such as the bottom-most, back-most point in the horizontal center of the spectacles' bridge 308.

Fitting servers 130 may identify a good-fitting or poorly fitting pair of spectacles 300, using the facial landmarks and the frame landmarks described herein and various spatial offsets between various combinations of the landmarks, before, during, after, and/or entirely separate from VTO operations. However, when the fitting operations are performed in combination with VTO operations, interface 202 may be operated to indicate a good fit or a poor fit of a particular pair of frames for a particular user.

Figure 6:
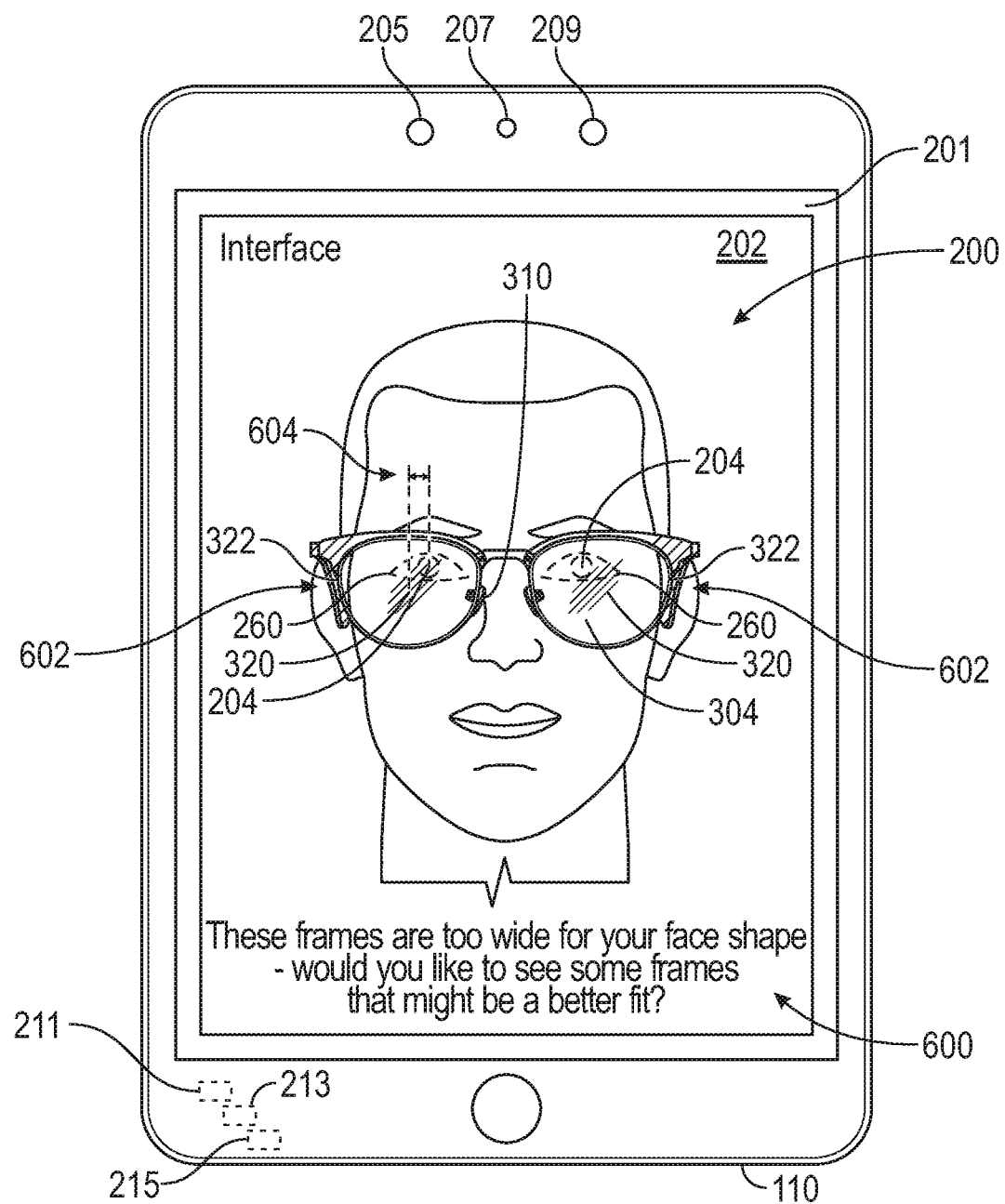
FIG. 6 is a schematic diagram illustrating an interface displaying a virtual representation of spectacles on an image of a user, along with misfit indicators, according to certain aspects of the disclosure.

FIG. 6 illustrates an example in which both a text indicator 600 and graphical indicators 602 and 604 have been added to the VTO display of virtual representation 400 and image 200, to alert the user of a poor fit for that particular frame 302. In this example, the text indicator 600 is provided in the form of an alert (e.g., "These frames are too wide for your face shape") and an option to obtain recommended frames that are more likely to fit (e.g., "would you like to see some frames that might be a better fit?"). The option may be a selectable option that can be selected by clicking or tapping the text itself, or may be provided in a chat portion of the interface (e.g., with a virtual assistant) that can be responded to by the user with written input.

As illustrated in FIG. 6, interface 202 may provide a graphical indicator 602 that includes a highlight of a poorly fitting portion of the virtual representation 400 of spectacles 300 (e.g., a portion of the frame 302 and/or lenses 304 that extends beyond the outer edges 218 of the user's face, as identified by a fitting engine of fitting servers 130 based on the placement operation for spectacles 300 and a determination of a portion of the frame 302 that extends beyond the outer edge of the user's face). FIG. 6 also illustrates another graphical indicator 604 that alerts the user to an x-direction offset between the user's pupil center 204 and the center 320 of lens 304 (e.g., with a dual-sided arrow and/or associated dashed lines to indicate the offset).

It should be appreciated that the graphical indicators 602 and 604 (and the content of the text indicator 600) are merely illustrative, and other numbers and/or combinations of indicators of these and/or other good or poor fit characteristics can be provided. For example, text and/or graphical indicators can be provided for x-direction and/or z-direction offsets between the user's pupil centers 204 and the centers 320 of lenses 304, x, y, and/or z-direction offsets between the upper ends 312 of the frame 302 and the user's eyebrow locations 216, x, y, and/or z-direction offsets between the bottoms 314 of the frames and the locations of the cheeks 214 of the user, and/or other x, y, and/or z-direction offsets between various combinations of frame landmarks, lens landmarks, and/or facial landmarks.

In various examples described herein, virtual representation 400 is a representation of a pair of spectacles 300 that have already been manufactured, or that can be manufactured in one of several standard size options, for which the fitting operations herein can help identify the correct size for each frame and for each user. However, it should also be appreciated that the facial location information of a user, obtained using the user device 110 as described herein, can also be used to generate a new 3D model of a pair of spectacles that can be used to manufacture a custom-sized frame for the user (e.g., using the user measurements to inform physical spectacle size distributions and/or thresholds). If desired, the user can order these custom-sized spectacles to be manufactured.

Figure 7:
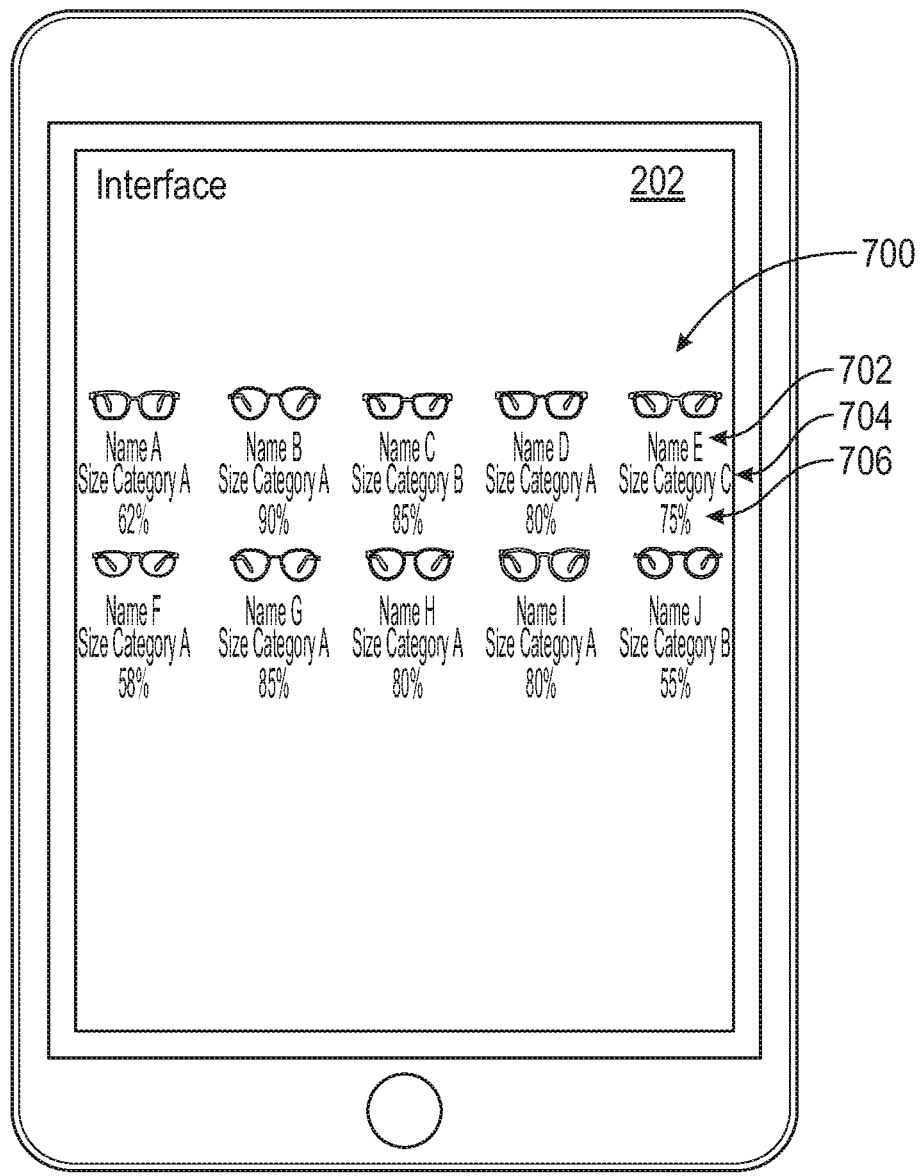
FIG. 7 is a schematic diagram illustrating an interface displaying a set of frames that have been determined to be likely to fit a particular user, according to certain aspects of the disclosure.

FIG. 7 illustrates a set of recommended frames, from a database of existing frames, that may be provided by interface 202 (e.g., in response to a selection of the selectable option in text indicator 600). In the example of FIG. 7, fitting server 130 has used the three-dimensional location information for the user, and size information for the frames in the frame database 142 of fitting servers 130 to identify a subset 700 of the frames in the frame database that are likely to fit the user. In this example, each of the subset of the frames is displayed with an image of the frame, and additional information including a descriptor 702 (e.g., a name), a size category 704, and a fit probability 706 (e.g., a percentage likelihood, sometimes referred to herein as $p_{fit}$, such as 45% or 95% that that frame is a fit for that user) for that frame. However, it should be appreciated that the subset of frames may be provided without displaying additional fit information if desired.

In one example, fitting servers 130 and/or a fitting application running on user device 110 determines the width of the user's head (e.g., the width between the user's pupil centers 202 or the width between the outer edges 218 of the user's head), and identifies a size category (e.g., a frame-width category such as extra-narrow, narrow, medium, wide, or extra wide) for the frames based on the user's head width. Each frame-width category may be defined by a range of frame widths. For example, each size category may correspond to a range of head widths (e.g., the frame widths of the frames in a particular size category are likely to fit users with the head widths in the corresponding head width range). Although the size categories 704 displayed in the example of FIG. 7 are text-described categories, it should be appreciated that that the displayed indicators of frame size can be numerical frame widths or frame-width ranges.

Figure 8:
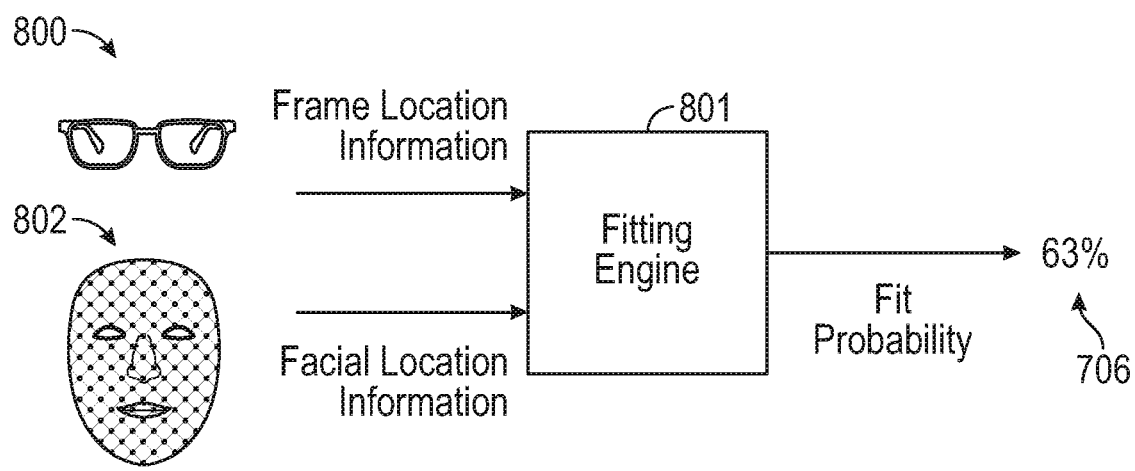
FIG. 8 is a flow diagram illustrating a fitting engine of a fitting server generating a fit probability for a pair of spectacle frames based on frame location information, user location information, and a trained machine-learning model, according to certain aspects of the disclosure.

The subset 700 of frames can be provided based on the determined width category alone, and/or other offsets between facial landmarks and frame and/or lens landmarks as described herein. For example, as illustrated in FIG. 8, a fitting engine 801 (e.g., a trained machine-learning engine and/or a rules-based engine running on one or more of fitting servers 130) can be arranged to receive, as inputs, facial location information associated with a particular user 802 (e.g., an image of the user, facial landmark locations, and/or three-dimensional information for determining facial landmark locations), and frame location information for each of one or more frames 800, and to generate an output corresponding to the fit probabilities 706 of FIG. 7, each fit probability corresponding to a particular frame and a particular user.

In one simple example, the frame location information is the frame width category, the facial location information is the head width of the user, and the fitting engine 801 may deterministically select a size category for the user based on the range in which the user's head width falls. In another example, interface 202 may be used to inform the user which size category they fall into. For example, when a user is viewing a particular frame (e.g., on a frame product detail page of a website or an application running on the user device), the user may be provided with a "Size" menu (e.g., a drop down menu) with selectable size categories (e.g., Narrow, Medium, Wide, and Extra Wide), and with an additional selectable "What size am I?" option). When the "What size am I?" option is selected, sensors of user device 110 can be operated to provide user measurements to the fitting operations described herein, to determine a size category for that user. The determined size category can be displayed to the user and/or frames of the determined size category can be automatically selected for the user. This frame size category may apply to all frames or can vary from frame-to-frame.

However, fitting engine 801 may also generate the fit probabilities 706 using a more complex combination of user images, facial location information, and/or frame and/or lens location information. Fitting engine 801 may generate a fit probability 706 based on a model-based or rules-based comparison of the facial location information and the frame location information.

As one example, fitting engine 801 may implement a machine-learning engine trained to generate fit probabilities 706 based on inputs of a three-dimensional frame model for the frame, and one or more of measurement point absolute three-dimensional locations 211 of the user, a three-dimensional model 213 of the user, and/or facial landmark absolute locations 215 of the user, as described herein.

As another example, fitting engine 801 may generate fit probabilities based on a combination of one or more of x-direction, y-direction, and/or z-direction offsets between the user's pupil centers 204 and the centers 320 of lenses 304, x, y, and/or z-direction offsets between the upper ends 312 of the frame 302 and the user's eyebrow locations 216, x, y, and/or z-direction offsets between the bottoms 314 of the frames and the locations of the cheeks 214 of the user, and/or other x, y, and/or z-direction offsets between various combinations of frame landmarks, lens landmarks, and/or facial landmarks. The offsets may be determined following a placement operation in which fitting engine 801 determines the position and orientation at which each particular frame would rest on the face of that particular user (e.g., using an iterative intersection (e.g., collision detection) operation between three-dimensional models of the user's face and the frames).

The combination may be, for example, a hierarchical rules-based combination in which each offset that falls outside of an acceptable range lowers the fit probability for the frame/user. As another example, the combination may be a weighted combination of the offsets.

For example, the offsets may be weighted using weights that have been selected and/or trained to factor in user and/or eyecare professional preferences and/or requirements. For example, optically important characteristics such as the pupil lens offsets may be weighted more heavily in the weighted combination than aesthetic offsets.

Training the fitting engine 801 may include providing frame location information, and facial location information for training users having various face shapes, to the fitting engine 801 as input training data, and providing eyecare-professional-determined fit judgements (e.g., based on the eyecare professionals evaluating the training users physically trying on various frames) to fitting engine 801, as output training data. The eyecare-professional-determined fit judgements can be binary judgements corresponding to "fit" or "no fit", fit judgements discretized and numericized in some other fashion, or fit judgements numericized on a spectrum.

The frame location information that is input to fitting engine 801 for training and/or fitting operations may include x, y, and/or z locations (e.g., in the coordinate system of FIG. 5 as determined based on a prior placement operation for the frames and the user) of various lens features such as the lens centers 320, the outer edges 322 of the lenses, the end pieces 316 of the frame, the nose pads 310, the bridge 308, the upper ends 312, and/or the lower ends 314 of the frames (as examples). In some scenarios, the frame landmark locations suitable for fitting operations may be provided directly to fitting engine 801. In other scenarios, fitting engine 801 may extract the frame landmark locations suitable for fitting operations from more general three-dimensional location information for the frames in the coordinate system of FIG. 5.

The facial location information that is input to fitting engine 801 for training and/or fitting operations may include x, y, and/or z locations (e.g., in the coordinate system of FIG. 5) of the pupil centers 204, the outer edges 218 of the user's face, the outer edges 260 of the user's eyes, the eyebrows 308, and the cheeks 214 of the user (as examples). In some scenarios, fitting engine 801 may be provided with facial location information that includes a set of points that define the entire shape of the face, and/or a three-dimensional model of the face, and can extract the facial landmark locations suitable for fitting operations from the received information. In other scenarios, the facial landmark locations suitable for fitting operations may be provided directly to fitting engine 801.

The set of recommended frames (e.g., subset 700) that is provided by interface 202 may be further based on a frame-similarity operation and/or a face-similarity operation. The frame-similarity operation may identify, based on the user's selection of one or more frames, and the set of those frames that fit, a set of similar frames that fit. In this way, the user may be provided with an expanded set of frames that are likely to fit and that are likely to be aesthetically pleasing to the user. The face-similarity operation may identify, based on the facial landmarks of the user, the facial landmarks of previous users, the selections and/or purchases made by the previous users, and/or a set of frames that have been selected and/or purchased by other users with similar faces. In this way, the user may be provided with an expanded set of frames that incorporate the collective preferences and/or knowledge of tens, hundreds, thousands, or millions of other users with similarly shaped faces. As noted herein, the facial landmarks of previous users, the selections and/or purchases made by the previous users, and/or a set of frames that have been selected and/or purchased by other users with similar faces may be stored in anonymized fashion and with and in accordance with the express permission and prior notification to the previous users.

The frame-similarity operation and/or the face-similarity operation can be performed separately from the fitting operation (e.g., responsive to a selection by the user of an option to see frames similar to one or more selected frames and/or a selection by the user of an option to see frames purchased by user's with similar face shapes), or can be performed integrally with the fitting operation (e.g., by providing previous user facial information and selection/purchase information to the fitting engine and by including trained weights for incorporating the frame-similarity and/or the face-similarity information into the ultimate fit probability for each face/user pair).

In some scenarios, the frame-similarity operation can be performed prior to fitting and/or VTO operations, so that fitting servers 130 have a pre-computed frame-similarity map that can be accessed during or after fitting operations. The frame-similarity operation can include determining a similarity score between each pair of frames in a frame database. The similarity score can be a combination of similarity sub-scores each corresponding to a feature category for the frames. The feature categories can include the material (e.g., acetate and/or metal), the shape (e.g., rectangular, round, cat-eye, square, aviator, etc.), the bridge style (e.g., aesthetic variants such as keyhole or sculpted keyhole, and/or fit-related variants such as low bridge or standard bridge), the color, and one or more fashion categories. The similarity sub-scores can have a highest value (e.g., 100%) for exact matches (e.g., the same shape) and lower values for features of decreasing similarity (e.g., cat-eye may be ranked as more similar to round than rectangular, and brown may be ranked as more similar to black than yellow). The sub-scores may be combined to generate a similarity score for each frame pair using a weighted combination of the sub-scores (where each feature category has an assigned weight) or using a hierarchical ranking in which one or several high priority feature categories determine the score, with lower priority categories used to break hierarchy ties.

Figure 9:
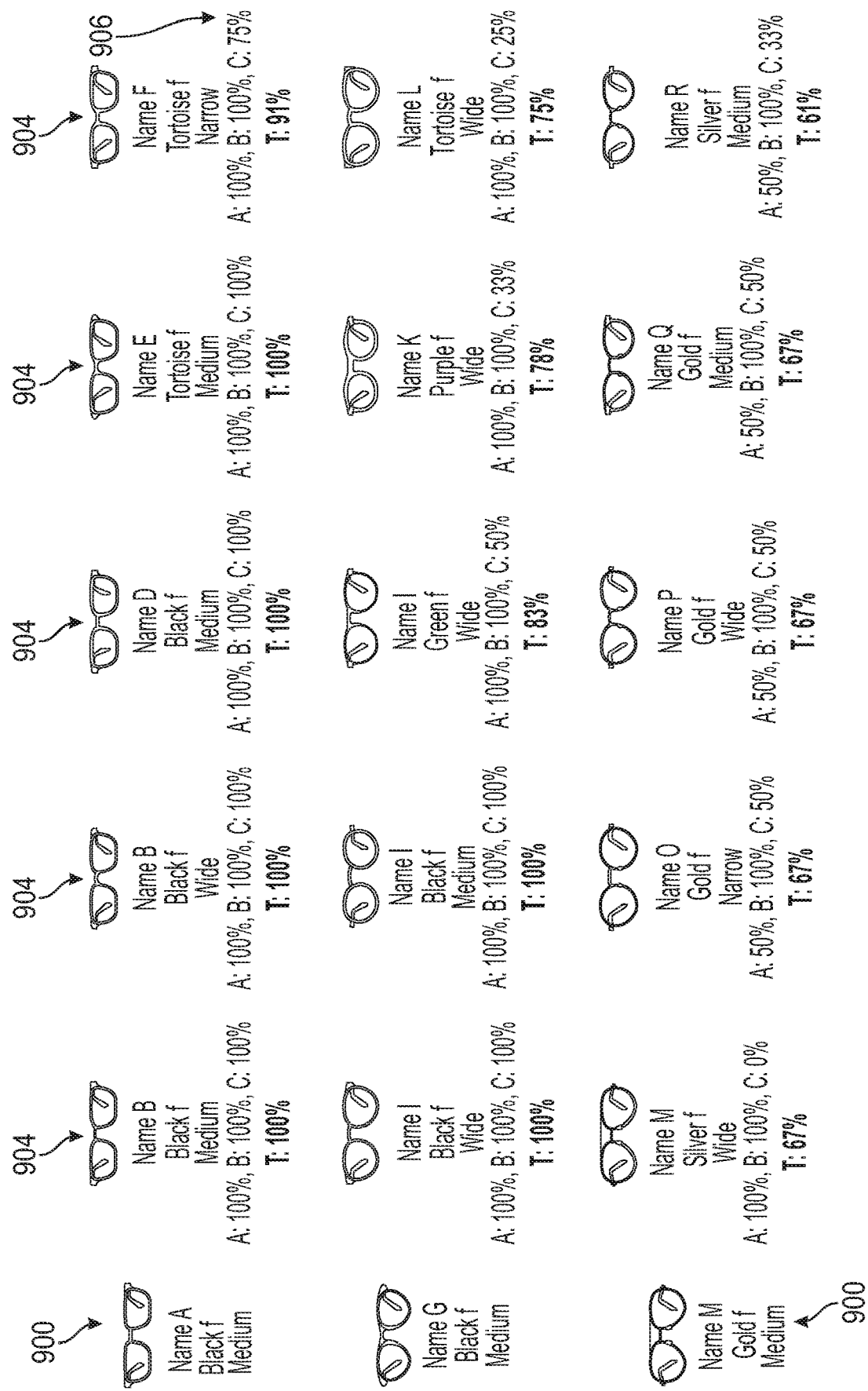
FIG. 9 is a schematic diagram illustrating a set of similar frames that can be identified for each of several selected frames, according to certain aspects of the disclosure.

FIG. 9 illustrates an example output of a frame-similarity operation, in which each of several selected frames 900 are shown, and the highest-similarity frames 904 for each of those three selected frames 900 are displayed. In this example, information 906 for each of the highest-similarity frames 904 is also shown. In this example, the information 906 includes a descriptor (e.g., "Name A Black f") for each frame, the similarity sub-scores for feature categories "A", B", and "C", and a total score "T" for frames 904. As can be seen in the figure, this example shows a hierarchical ranking of the highest-similarity frames 904, using lower priority sub-scores to break ties in the hierarchy.

In various examples described above, the fitting operation is performed in coordination with a VTO operation. However, in some scenarios, a fitting operation may be performed before, or entirely separately from a VTO operation. For example, a user that is merely browsing an online catalog of frames can be provided with an option to narrow their search to frames that are likely to fit.

Figure 10:
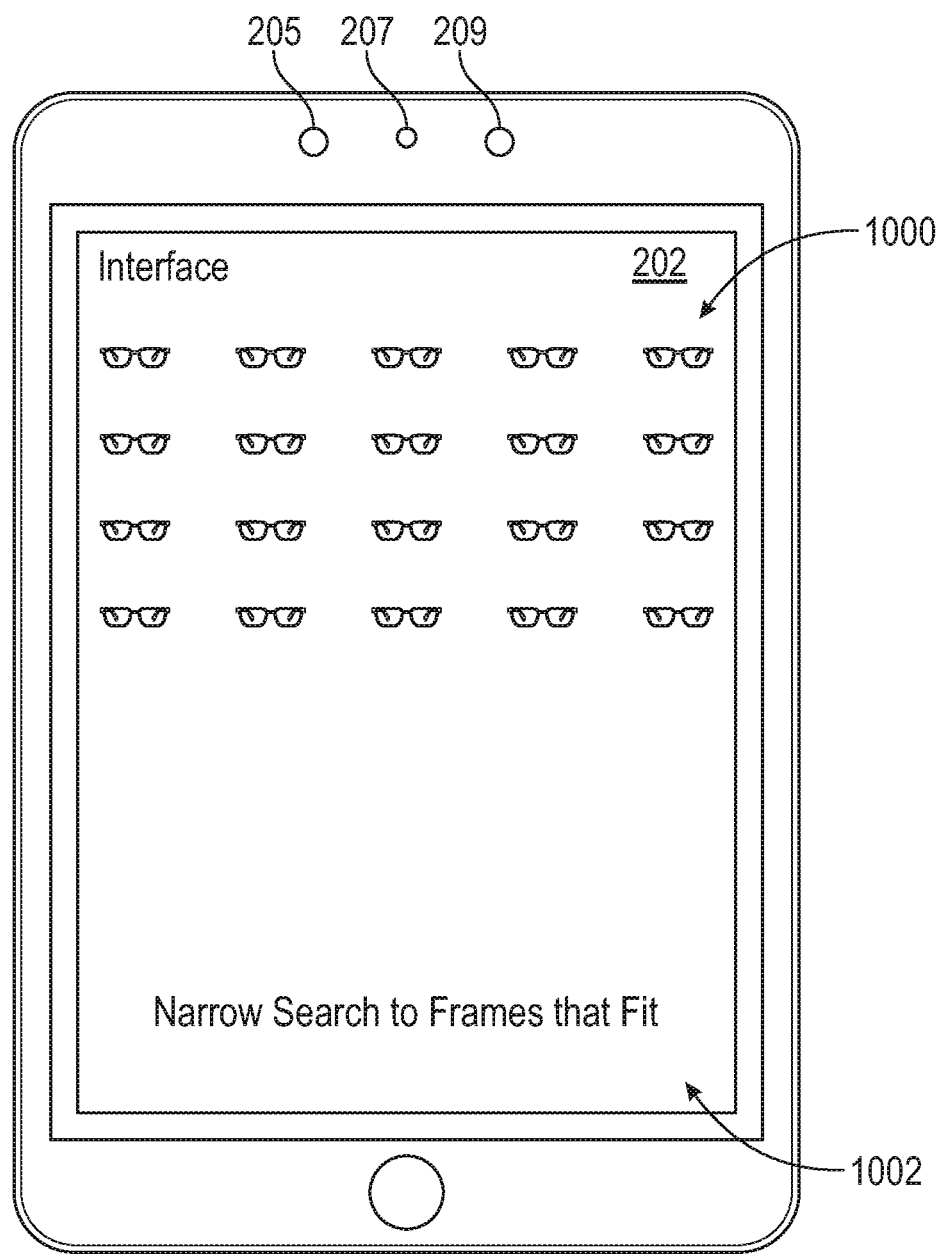
FIG. 10 is a schematic diagram illustrating an interface displaying frames that are selectable from a frame database, according to certain aspects of the disclosure.

FIG. 10 illustrates a scenario in which interface 202 is being used to display frames 1000 in a frame database associated with fitting servers 130. As shown in FIG. 10, a selectable option 1002 may be provided, by interface 202, to narrow the search to frames that fit.

Figure 11:
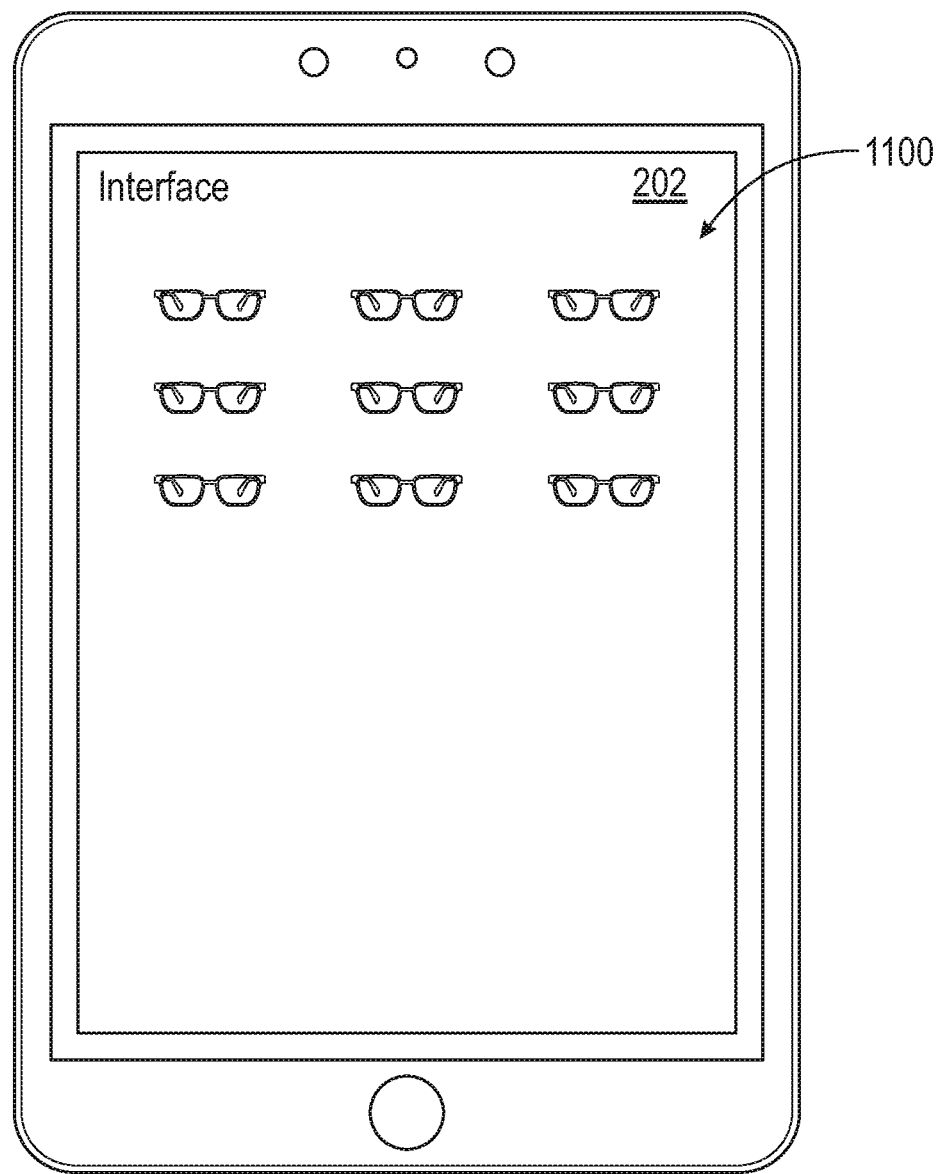
FIG. 11 is a schematic diagram illustrating an interface displaying a subset of the frames of FIG. 10 that have been determined to be likely to fit a particular user, according to certain aspects of the disclosure.

Responsive to a selection of option 1002, camera 205, light source 207, and/or sensor 209 may be activated to obtain three-dimensional location information for the user. The three-dimensional location information for the user is provided to fitting engine 801 of the fitting servers, and a subset 1100 of the frames in the frame database having the highest fit probabilities can be provided to the user via interface 202, as illustrated in FIG. 11. In this way, sensor data from camera 205, light source 207, and/or sensor 209 can be used by fitting engine 801 to determine fit information for a particular frame/user pair.

Figure 12:
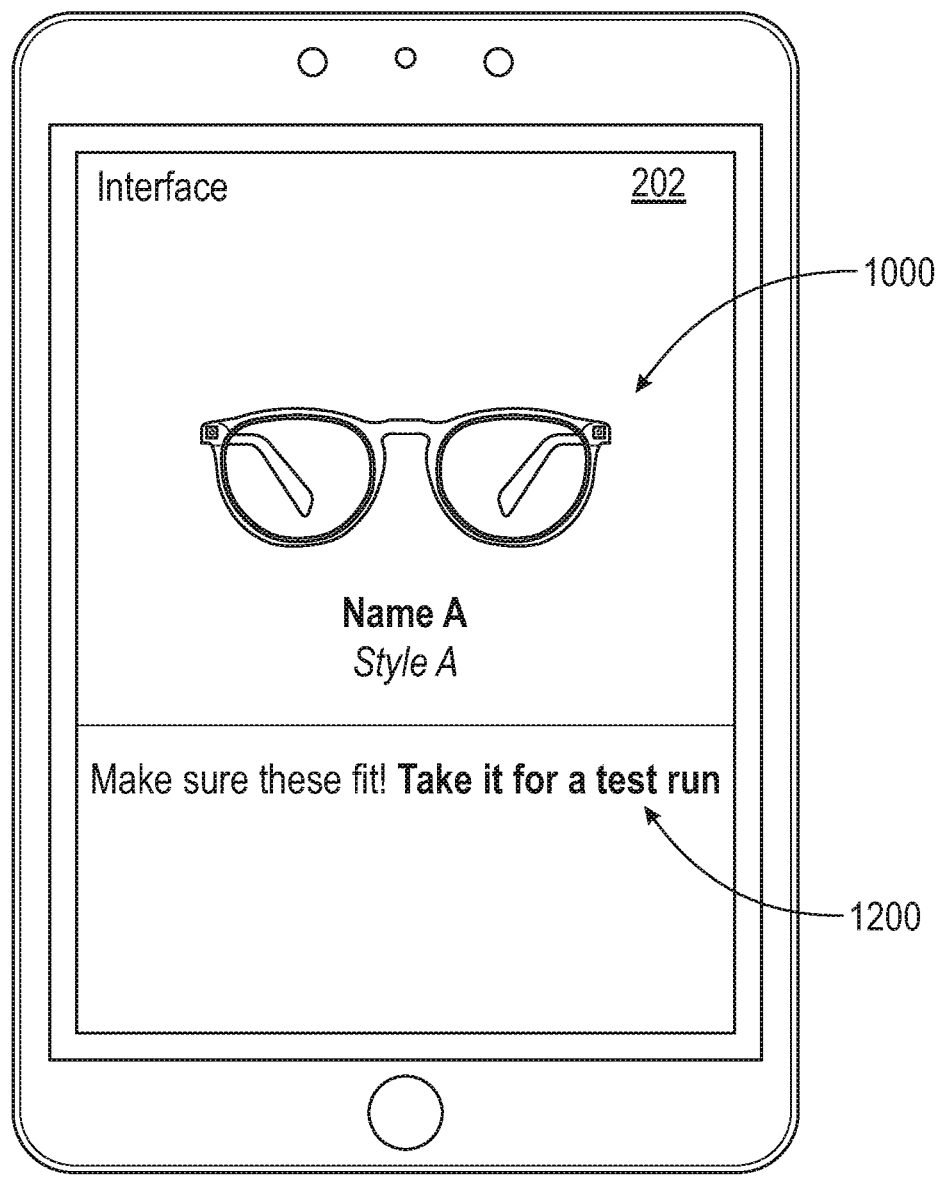
FIG. 12 is a schematic diagram illustrating an interface displaying a selected pair of spectacle frames, according to certain aspects of the disclosure.

If the user does not elect to perform a fitting operation to narrow the catalog of frames being searched before selecting one or more frames for closer review, the user can be provided with a selectable option 1200 to perform a fitting operation after the one or more frames have been selected, as illustrated in FIG. 12. In the example of FIG. 12, one frame 1000 has been selected, and the selectable option 1200 is a text-based option (e.g., "Make sure these fit! Take it for a test run") that, when selected, causes user device 110 and fitting servers 130 to perform a fitting operation. For example, responsive to a selection of option 1200, camera 205, light source 207, and/or sensor 209 may be activated to obtain three-dimensional location information for the user. The three-dimensional location information for the user is provided to fitting engine 801 of the fitting servers, along with frame location information for the selected frames, and a fit probability 706 for the frames, and/or other fit information (e.g., specific poor-fit information for particular features and/or offsets) for the frames may be generated.

If the user later requests a virtual try-on of the frames, the fit information determined for those frames can be used to generate text and/or graphical indicators, such as indicators 600, 602, and 604 of FIG. 6, for display with images of the user and a virtual representation of the frames overlaid.

Figure 13:
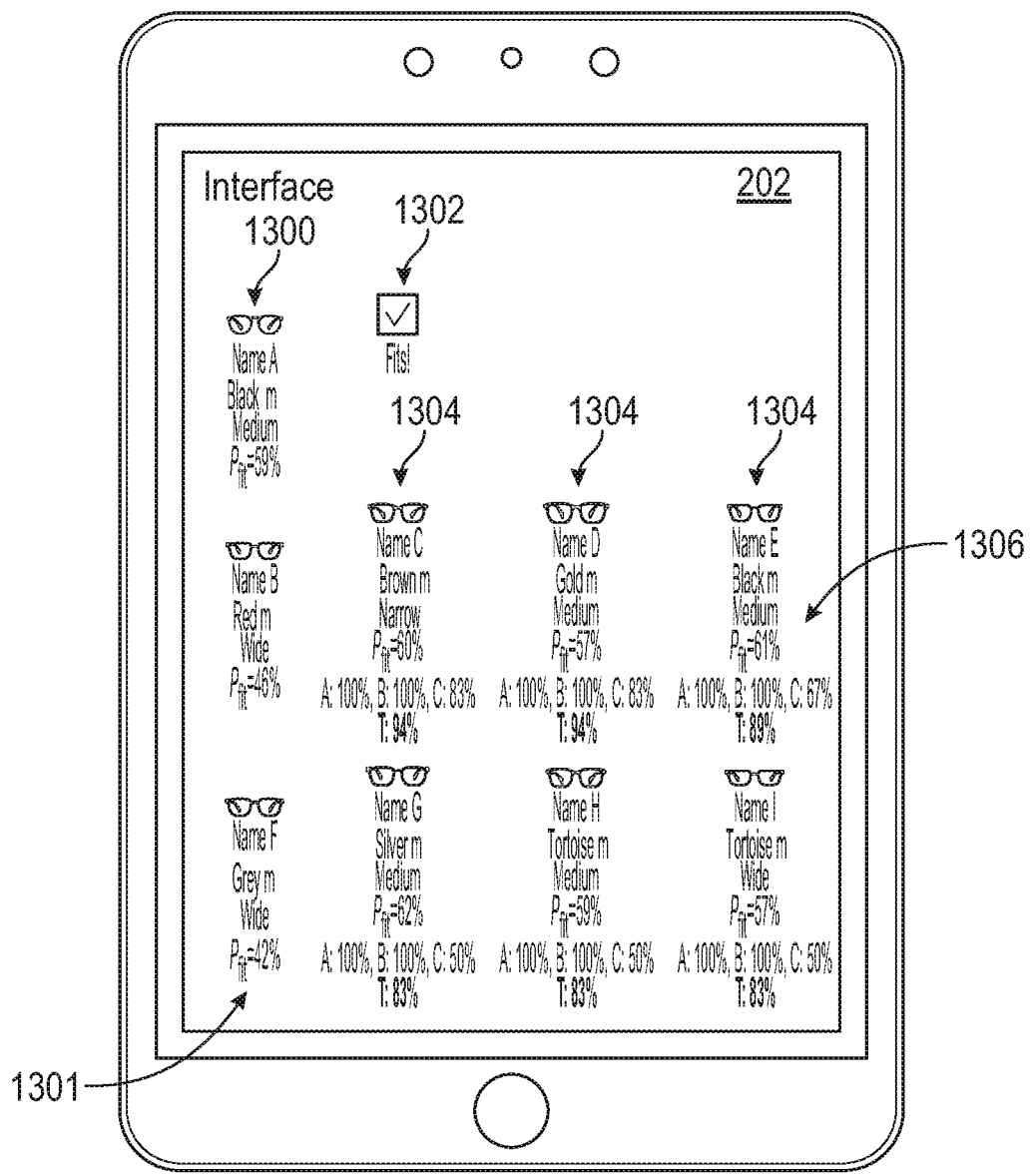
FIG. 13 is a schematic diagram illustrating an interface displaying better fitting frames that are similar to one or more selected frames, according to certain aspects of the disclosure.

In the example of FIG. 12, only one frame 1000 is selected for review and fitting. However, in some scenarios, a user may choose one, two, three, or more than three frames for which to perform a fitting operation. FIG. 13 illustrates an example of fit results that can be provided by interface 202 when a fitting operation is performed for three selected frames.

In the example of FIG. 13, the user has selected one frame 1300 that has been determined to be a good fit (as indicated by fit indicator 1302, such as due to a fit percentage above 50 percent), and two frames 1301 that have been determined not to fit (see fit percentages $p_{fit}$ of 46% and 42%). For each of the two frames 1301 that have been determined not to fit, a set of similar frames 1304 is provided, each with information 1306 that describes the fit ($p_{fit}$) of that frame.

As can be seen in FIG. 13, the similar frames 1304 are displayed in a hierarchical (left to right) ranking that first prioritizes the fit, and then the frame similarity categories as described above in connection with FIG. 9. Each of the frames provided in interface 202 can be selectable for further review and/or for virtual try-on. If the user later requests a virtual try-on of the selected frames, the fit information determined for those frames can be used to generate text and/or graphical indicators, such as indicators 600, 602, and 604 of FIG. 6, for display with images of the user and a virtual representation of the frames overlaid.

Figure 14:
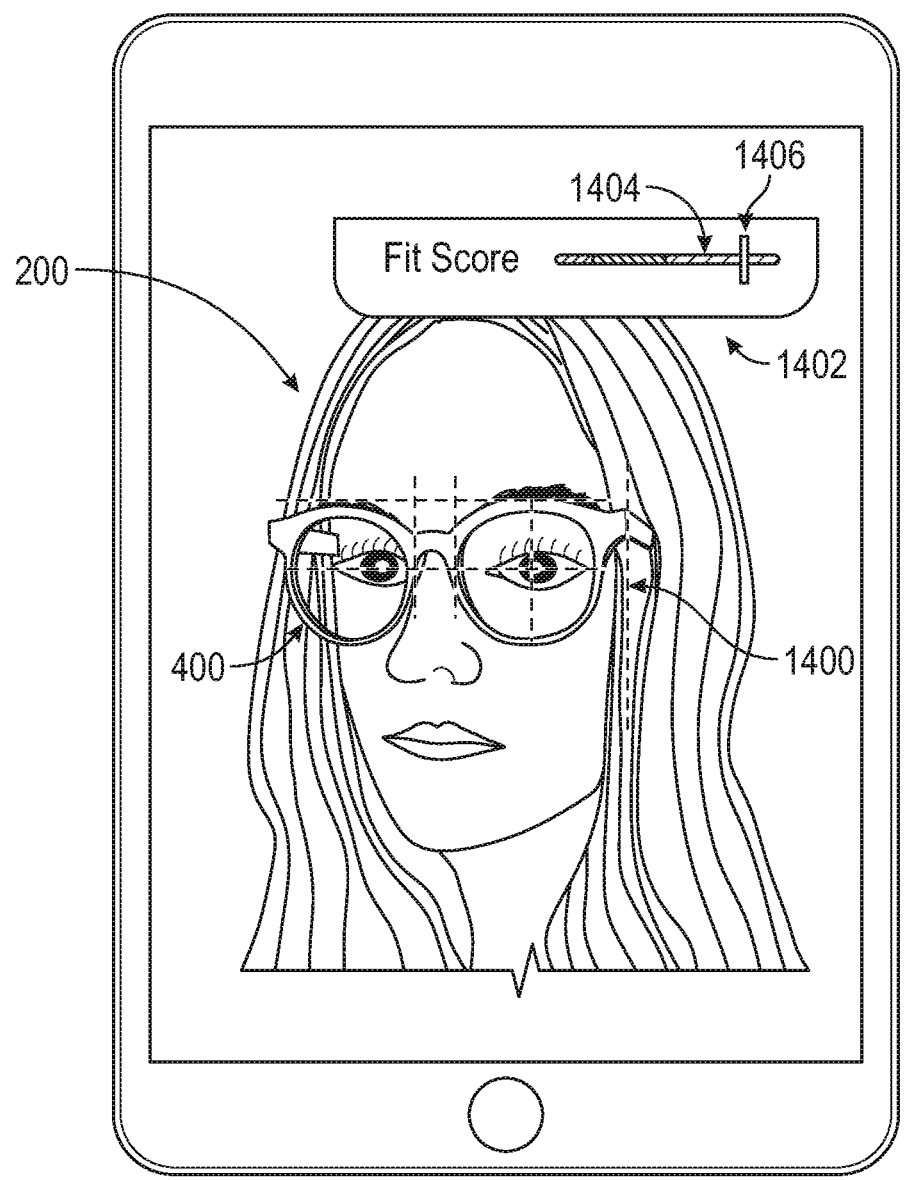
FIG. 14 is a schematic diagram illustrating a VTO interface with fit guidance, according to certain aspects of the disclosure.

FIG. 14 illustrates interface 202 displaying both fit information and virtual try-on (VTO) information in an integrated display. In the example of FIG. 14, an image 200 of the user is overlaid with a virtual representation 400 of spectacle frames (e.g., using the VTO operations described herein) and with graphical fit indicators 1400 and 1402, that may be used to provide fit guidance for the user. In this example, graphical fit indicators 1400 include guidelines indicating positions of frame landmarks for the frame of the spectacles (e.g., guidelines implemented as dashed lines that indicate the location and orientation of the lens centers, and the tops and outer edges of the frames). The user may use graphical fit indicators 1400 to help determine the alignment of the frames and lenses with the pupil centers and/or the outer edges of the user's face. In the example of FIG. 14, an additional graphical fit indicator 1402 is provided that includes a color-coded fit scale bar 1404 and a marker 1406 indicating the fit of the current spectacles on the user's face. As can be seen in FIG. 14, the pupil centers and lens centers are aligned, and the outer edge of the frame is aligned with the outer edge of the user's face, resulting in a relatively high fit score.

If desired, the graphical fit indicators 1400 and/or 1402 can be switched on and off by the user to allow the user to control determination of fit and/or aesthetic features of a selected pair of spectacles.

Figure 15:
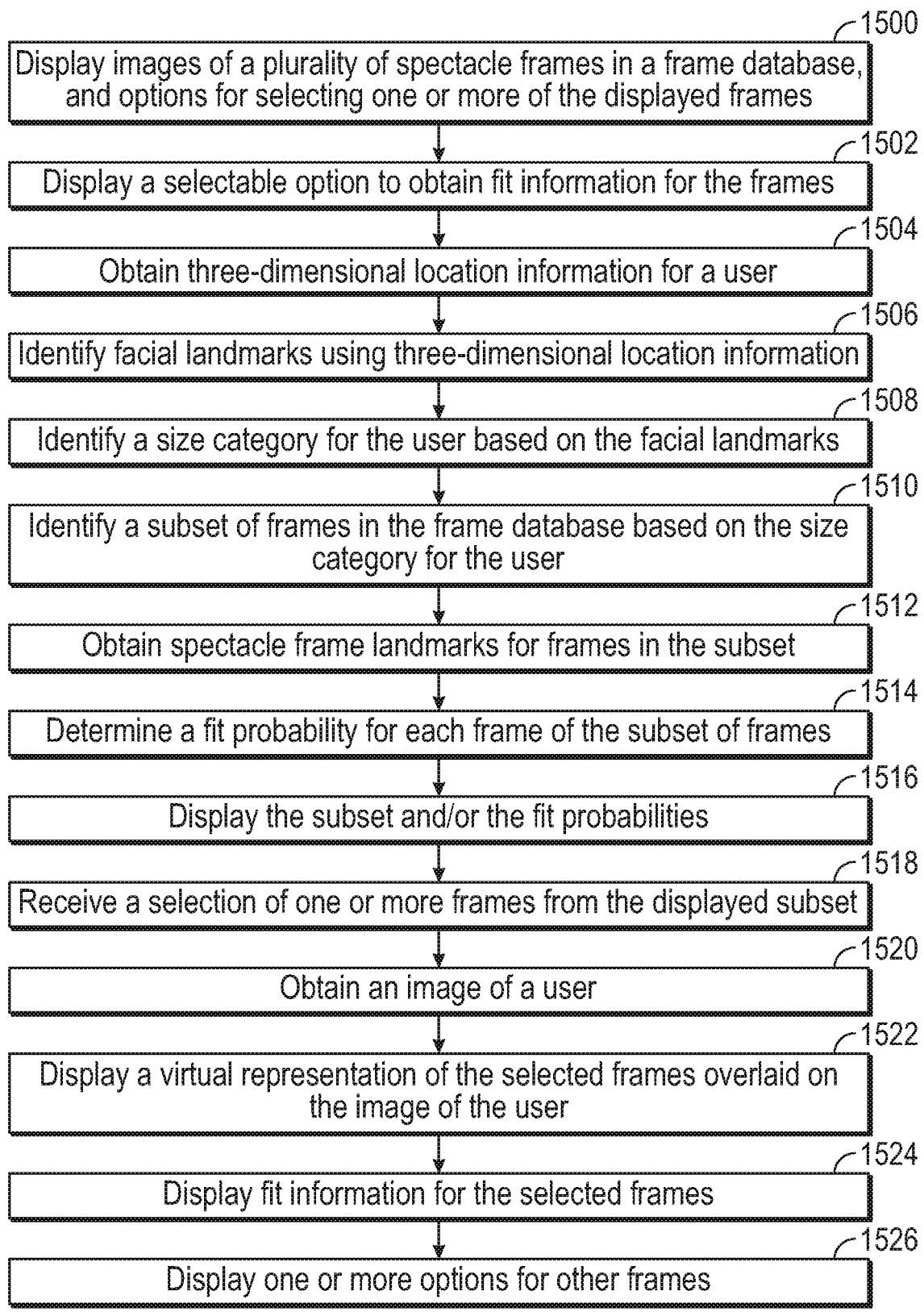
FIG. 15 illustrates an example process for virtual fitting of spectacles having frame information in a frame database, according to certain aspects of the disclosure.

FIG. 15 illustrates a flow diagram of an example process for virtual fitting of spectacles, in accordance with one or more implementations. For explanatory purposes, the process of FIG. 15 is primarily described herein with reference to one or more devices of FIGS. 1 and 2 (particularly with reference to fitting servers 130 and/or user devices 110), which may be executed by one or more processors of the servers 130 and/or user devices 110 of FIG. 1. However, the process of FIG. 15 is not limited to servers 130 and/or user devices 110, and one or more blocks (or operations) of the process may be performed by one or more other components of other suitable devices. Further for explanatory purposes, the blocks of the process of FIG. 15 are described herein as occurring in series, or linearly. However, multiple blocks of the process of FIG. 15 may occur in parallel. In addition, the blocks of the process of FIG. 15 need not be performed in the order shown and/or one or more blocks of the process of FIG. 15 need not be performed and/or can be replaced by other operations.

At block 1500, a user interface such as interface 202 described herein and running on user device 110 may display images of a plurality of spectacle frames in a frame database, and options for selecting one or more of the displayed frames. For example, FIG. 10 above shows an example in which frames 1000 from a frame database of a fitting server 130 are displayed in interface 202. For example, the user device 110 may provide a request to a fitting server 130 for information associated with the spectacle frames in a spectacle database associated with the fitting server 130. The fitting server may obtain the frame information from a local frame database and/or one or more remote databases (e.g., of a third-party server 140), and provide the frame information to the user device. The interface 202 may display the frame information including the images of the frames and/or other descriptive information for the frames (e.g., a name, a size category, a style, a shape, a material, a fashion, a bridge style, etc.)

At block 1502, a selectable option to obtain fit information for frames is displayed. In the example of FIG. 10 above, the selectable option 1002 is an option to narrow the frames search to frames that are likely to fit the particular user of the user device.

At block 1504, (e.g., responsive to a selection by the user of option 1002), three-dimensional location information for the user may be obtained. For example, the three-dimensional location information may include measurement point absolute three-dimensional locations 211, a three-dimensional model 213 of the user based on the measurement point absolute three-dimensional locations 211, and/or facial landmark absolute locations 215 as described herein. The three-dimensional location information may be obtained, for example, using an additional sensor such as sensor 209 and/or a light source such as light source 207 (see, e.g., FIG. 2).

At block 1506, one or more facial landmarks are identified using the three-dimensional location information for the user. For example, facial landmarks such as the user's pupil centers 204, cheeks 214, eyebrows 216, and/or outer edges 218 of the user's face may be extracted from the three-dimensional location information (e.g., by selecting location points corresponding to the facial landmarks or by computing the facial landmark locations based on other location information in the three-dimensional location information).

At block 1508, a size category for the user may be identified based on the facial landmarks. For example, a user measurement such as a head width or another facial measurement may be determined for the user, and the size category may be identified by identifying a width range associated with a size category, within which the user's head width falls. As described herein, a "size category" can be a labeled category (e.g., extra narrow, narrow, medium, wide, extra wide) that corresponds to a range of frame widths, can be a labeled category (e.g., extra narrow, narrow, medium, wide, extra wide) that corresponds to one particular frame width, can be an unlabeled group of frames where each frame in a particular group has a frame width in a range corresponding to that group, can be an unlabeled group of frames where each frame in a particular group has a specific frame width corresponding to that group, or can be a labeled or unlabeled group of frames with other individual frame size attributes or with any of various more complex combinations of frame size attributes.

At block 1510, a subset of the frames in the frame database are identified based on the size category of the user. For example, a subset such as subset 1100 of FIG. 11 can be displayed that only includes frames in the identified size category.

In some operational scenarios, a bridge style (e.g., a low bridge style, a standard bridge style, and/or one of various aesthetic bridge styles) is identified for the user based on the three-dimensional location information. A further subset of the subset of the plurality of spectacle frames may be displayed, where each of the spectacle frames in the further subset having the identified bridge style.

At block 1512, spectacle frame landmark locations may be identified for the frames in the subset. The frame landmark locations may be obtained for the subset so that fitting operations are performed only for the subset to reduce computing power used in the fitting operations. The frame landmark locations may be stored in the frame database and/or determined based on a three-dimensional model of the frame(s). The three-dimensional model may be obtained from a database of models (e.g., one of databases 142 of FIG. 1), each corresponding to a real-world pair of spectacles, the models stored at fitting server 130 or another server. Obtaining the three-dimensional model of the spectacles may include downloading the three-dimensional model of the spectacles from the server to user device 110 (e.g., if fitting operations are performed at the user device).

At block 1514, a fit probability, such as fit probability 706 of FIG. 7, for each frame in the subset may be determined (e.g., by fitting engine 801 as described above in connection with FIG. 8). Determining the fit probability may include providing the facial landmark locations and the frame landmark locations to the fitting engine 801, the fitting engine having been trained to generate the fit probability based on the frame landmark locations and the facial landmark locations.

At block 1516, the subset and/or the fit probabilities may be displayed (e.g., by interface 202). For example, FIG. 11 illustrates an example in which a subset 1100 is displayed. FIG. 7 illustrates an example in which subset 700 of frames are displayed with the computed fit probabilities 706. Displaying the subset and/or the fit probabilities may include displaying the frames of the subset in an order of descending fit likelihood.

At block 1518, a selection of one or more frames from the displayed subset may be received (e.g., at user device 110 and/or fitting server 130) via interface 202.

At block 1520, an image of a user may be obtained (e.g., responsive to the selection of the one or more frames). For example, an image such as image 200 of FIG. 2 may be captured using a camera, such as camera 205 of user device 110.

At block 1522, a combined image is displayed in which, for example, the virtual representation of the spectacles, with the determined size, position and/or orientation is overlaid on the image of the user for display (e.g., using display 201 of user device 110) as illustrated in, for example, FIG. 4. Displaying the combined image may include determining the position and/or the orientation for the digital representation of the spectacles by performing physical placement operations which may include a combination of one or more iterative collision detection (intersection) and binary position search operations, and may include one or more high-fidelity position-improvement operations.

At block 1524, fit information for the selected frames is displayed. For example, fit information can include text or graphical indicators (see, e.g., indicators 600 and 602) of a poor fit of the displayed virtual representation, a numerical fit probability (see, e.g., $p_{fit}$ in FIGS. 7 and 13), and/or graphical fit guidance indicators such as indicators 1400 and/or 1402 of FIG. 14. A poor fit may be determined by a fit probability below a fit threshold (e.g., a threshold of 50 percent, 60 percent, 70 percent, 80 percent, 90 percent, or 95 percent).

At block 1526, one or more options for other frames can be provided to the user. For example, interface 202 can be operated to provide options to display frames that are similar to the selected frames and/or to display frames that have been previously purchased and/or selected by other users with face shapes that are similar to the face shape of the current user. When selected, these options may cause interface 202 to display the frames that are similar to the selected frames and/or to display frames that have been previously purchased and/or selected by other users with face shapes that are similar to the face shape of the current user (using anonymized data stored with and in accordance with the express permission of, and prior notification to the other users). For example, FIG. 13 illustrates an example in which frames 1304 that are similar to one or more selected frames are displayed. In the example of FIG. 13, the frames 1304 are provided with fit information 1306, and are ordered according to the fit probability and the similarity of the other frames to the frames selected by the user.

The operations described above in connection with FIG. 15 can provide virtual fit and/or VTO interactivity for a user starting from a general digital catalog of available frames. However, in some scenarios, the fitting and/or VTO operations can be performed after one or more frames have already been selected by the user.

Figure 16:
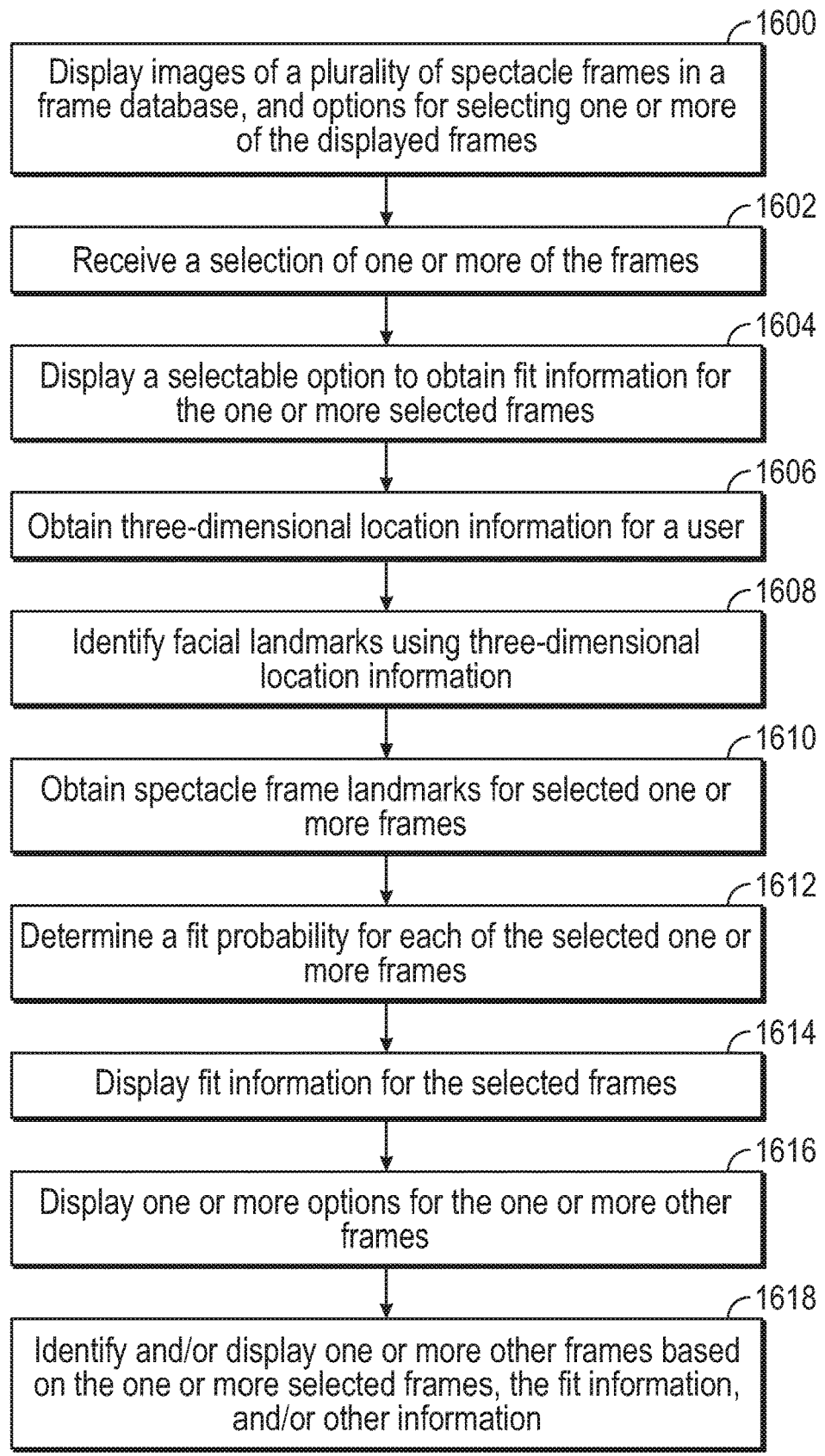
FIG. 16 illustrates an example process for virtual fitting of a selected pair of spectacle frames, according to certain aspects of the disclosure.

FIG. 16 illustrates a flow diagram of an example process fitting operations for one or more selected frames, in accordance with one or more implementations. For explanatory purposes, the process of FIG. 16 is primarily described herein with reference to one or more devices of FIGS. 1 and 2 (particularly with reference to fitting servers 130 and/or user devices 110), which may be executed by one or more processors of the servers 130 and/or user devices 110. However, the process of FIG. 16 is not limited to servers 130 and/or user devices 110, and one or more blocks (or operations) of the process may be performed by one or more other components of other suitable devices. Further for explanatory purposes, the blocks of the process of FIG. 16 are described herein as occurring in series, or linearly. However, multiple blocks of the process of FIG. 16 may occur in parallel. In addition, the blocks of the process of FIG. 16 need not be performed in the order shown and/or one or more blocks of the process of FIG. 12 need not be performed and/or can be replaced by other operations.

At block 1600, a user interface such as interface 202 described herein and running on user device 110 may display images of a plurality of spectacle frames in a frame database, and options for selecting one or more of the displayed frames. For example, FIG. 10 above shows an example in which frames 1000 from a frame database of a fitting server 130 are displayed in interface 202.

At block 1602, a selection of one or more of the displayed frames is received (e.g., at user device 110 and/or fitting server 130) via interface 202.

At block 1604, a selectable option to obtain fit information for the one or more selected frames is provided by the interface. For example, FIG. 12 illustrates a scenario in which interface 202 displays a selectable option 1200 to obtain fit information for a selected frame 1000.

At block 1606, (e.g., responsive to a selection by the user of option 1002), three-dimensional location information for the user may be obtained. For example, the three-dimensional location information may include measurement point absolute three-dimensional locations 211, a three-dimensional model 213 of the user based on the measurement point absolute three-dimensional locations 211, and/or facial landmark absolute locations 215 as described herein. The three-dimensional location information may be obtained, for example, using an additional sensor such as sensor 209 and/or a light source such as light source 207 (see, e.g., FIG. 2).

At block 1608, one or more facial landmarks are identified using the three-dimensional location information for the user. For example, facial landmarks such as the user's pupil centers 204, cheeks 214, eyebrows 216, and/or outer edges 218 of the user's face may be extracted from the three-dimensional location information (e.g., by selecting location points corresponding to the facial landmarks, or by computing the facial landmark locations based on other location information, such as other measurement locations and/or a three-dimensional model, in the three-dimensional location information).

At block 1610, spectacle frame landmark locations may be identified for the one or more frames. The frame landmark locations may be stored in the frame database and/or determined based on a three-dimensional model of the frame(s). The three-dimensional model may be obtained from a database of models (e.g., one of databases 142 of FIG. 1), each corresponding to a real-world pair of spectacles, the models stored at fitting server 130 or another server. Obtaining the three-dimensional model of the spectacles may include downloading the three-dimensional model of the spectacles from the server to user device 110 (e.g., if fitting operations are performed at the user device).

At block 1612, a fit probability, such as fit probability 706 of FIG. 7, for each of the one or more selected frames may be determined (e.g., by fitting engine 801 as described above in connection with FIG. 8). Determining the fit probability may include providing the facial landmark locations and the frame landmark locations to the fitting engine 801, the fitting engine having been trained to generate the fit probability based on the frame landmark locations and the facial landmark locations.

At block 1614, fit information for the selected frames is displayed together with the virtual representation of the spectacles overlaid on the image of the user. For example, fit information can include text or graphical indicators (see, e.g., indicators 600 and 602) of a poor fit of the displayed virtual representation, a numerical fit probability (see, e.g., $p_{fit}$ in FIGS. 7 and 13), and/or graphical fit guidance indicators such as indicators 1400 and/or 1402 of FIG. 14.

At block 1616, one or more options for other frames can be provided to the user. For example, interface 202 can be operated to provide options to display frames that are better fits than the selected frames, frames that are similar to the selected frames, and/or frames that have been previously purchased and/or selected by users with face shapes that are similar to the face shape of the user.

At block 1618, fitting servers 130 and/or user device 110 may identify and/or display (e.g., responsive to a selection of one or more of the options of block 1616) one or more other frames based on the one or more selected frames, the fit information, and/or other information. For example, FIG. 7 illustrates an example in which a subset 700 of frames that are likely to fit the user are displayed, along with fit information (e.g., fit probabilities 706) for each frame. As another example, FIG. 13 illustrates an example in which frames 1304 that are similar to one or more selected frames are displayed. In the example of FIG. 13, the frames 1304 are provided with fit information 1306, and are ordered according to the fit probability and the similarity of the other frames to the frames selected by the user. As another example, frames that have been previously purchased by other users having a similar face shape to the face shape of the current user can be identified and displayed (e.g., ordered according to the fit probability and the similarity of the face shape of the other user that selected those frames and the face shape of the current user).

It should be appreciated that, if desired, the VTO operations described above in connection with the operations of blocks 1522 and/or 1524 of FIG. 15 can also be performed for any or all of the selected frames.

The operations described above in connection with FIG. 16 can provide virtual fit and/or VTO interactivity for a user following the selection of one or more selected frames from an online frame catalog representing frames in a frame database. However, in some scenarios, the fitting operations can be initiated from within a VTO display in interface 202.

Figure 17:
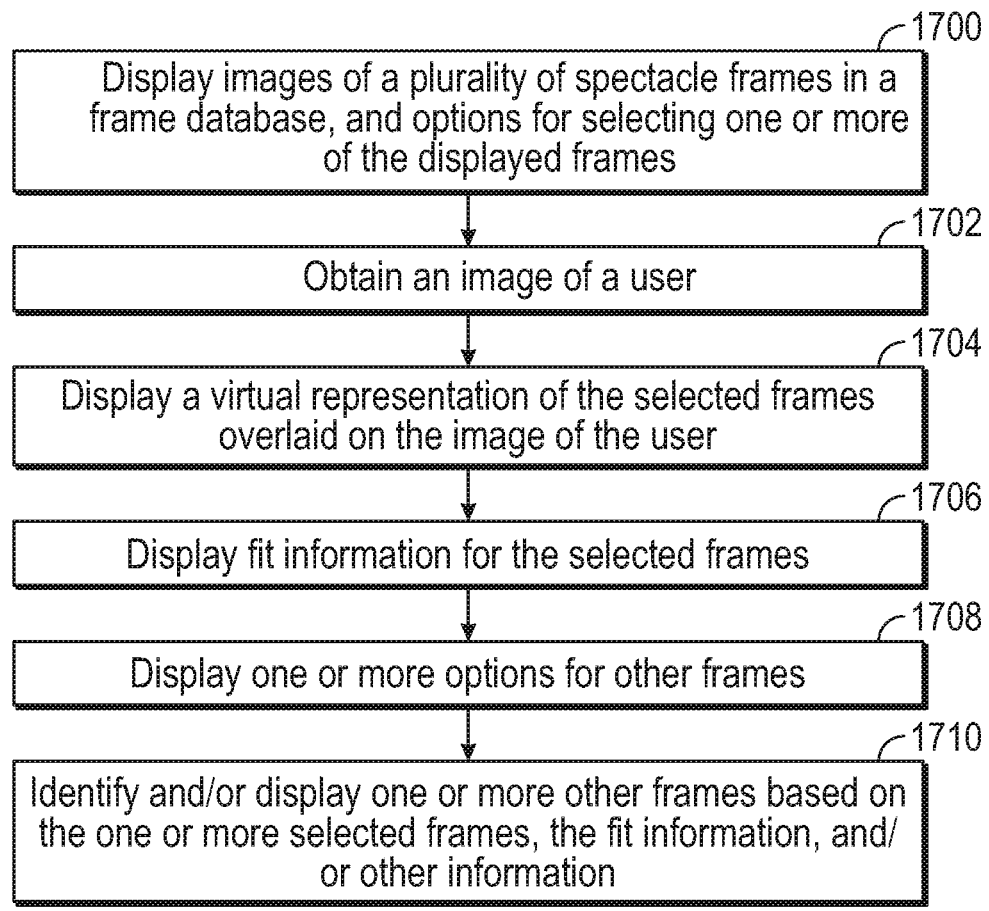
FIG. 17 illustrates an example process for virtual try-on and fitting of a selected pair of spectacle frames, according to certain aspects of the disclosure.

FIG. 17 illustrates a flow diagram of an example process for fitting operations initiated from within a VTO display, in accordance with one or more implementations. For explanatory purposes, the process of FIG. 17 is primarily described herein with reference to one or more devices of FIGS. 1 and 2 (particularly with reference to fitting servers 130 and/or user devices 110), which may be executed by one or more processors of the servers 130 and/or user devices 110. However, the process of FIG. 17 is not limited to servers 130 and/or user devices 110, and one or more blocks (or operations) of the process may be performed by one or more other components of other suitable devices. Further for explanatory purposes, the blocks of the process of FIG. 17 are described herein as occurring in series, or linearly. However, multiple blocks of the process of FIG. 17 may occur in parallel. In addition, the blocks of the process of FIG. 17 need not be performed in the order shown and/or one or more blocks of the process of FIG. 17 need not be performed and/or can be replaced by other operations.

At block 1700, a user interface such as interface 202 described herein and running on user device 110 may display images of a plurality of spectacle frames in a frame database, and options for selecting one or more of the displayed frames. For example, FIG. 10 above shows an example in which frames 1000 from a frame database of a fitting server 130 are displayed in interface 202.

At block 1702, an image of a user may be obtained (e.g., responsive to the selection of the one or more frames). For example, an image such as image 200 of FIG. 2 may be captured using a camera such as camera 205 of user device 110.

At block 1704, a combined image is displayed in which, for example, the virtual representation of the spectacles, with the determined size, position and/or orientation is overlaid on the image of the user for display (e.g., using display 201 of user device 110) as illustrated in, for example, FIG. 4. Displaying the combined image may include determining the position and/or the orientation for the digital representation of the spectacles by performing physical placement operations which may include a combination of one or more iterative collision detection (intersection) and binary position search operations, and may include one or more high-fidelity position-improvement operations.

At block 1706, fit information for the selected frames is displayed. For example, fit information can include text or graphical indicators (see, e.g., indicators 600 and 602) of a poor fit of the displayed virtual representation, a numerical fit probability (see, e.g., $p_{fit}$ in FIGS. 7 and 13), and/or graphical fit guidance indicators such as indicators 1400 and/or 1402 of FIG. 14.

At block 1708, one or more options for other frames (e.g., frames other than the frames being represented by the currently displayed virtual frame representation overlaid on the images of the user) can be provided to the user. For example, interface 202 can be operated to display selectable options to display frames that are better fits than the selected frames (see, e.g., indicator 600 of FIG. 6), frames that are similar to the selected frames, and/or frames that have been previously purchased and/or selected by users with face shapes that are similar to the face shape of the user.

At block 1710, fitting servers 130 and/or user device 110 may identify and/or display (e.g., responsive to a selection by the user of one or more of the options for other frames) one or more other frames based on the one or more selected frames, the fit information, and/or other information. For example, FIG. 7 illustrates an example in which a subset 700 of frames that are likely to fit the user are displayed, along with fit information (e.g., fit probabilities 706) for each frame. As another example, FIG. 13 illustrates an example in which frames 1304 that are similar to one or more selected frames are displayed. In the example of FIG. 13, the frames 1304 are provided with fit information 1306, and are ordered according to the fit probability and the similarity of the other frames to the frames selected by the user.

As another example, frames that have been previously purchased by other users having a similar face shape to the face shape of the current user can be identified and displayed (e.g., ordered according to the fit probability and the similarity of the face shape of the other user associated with those frames and the face shape of the current user). The other frames may be provided in an array of selectable images of the frames, and/or a next best match (e.g., best fit, closest frame and/or user face shape similarity) can immediately replace the currently represented frames in the VTO display (e.g., without requiring a selection of those next best frames by the user).

Figure 18:
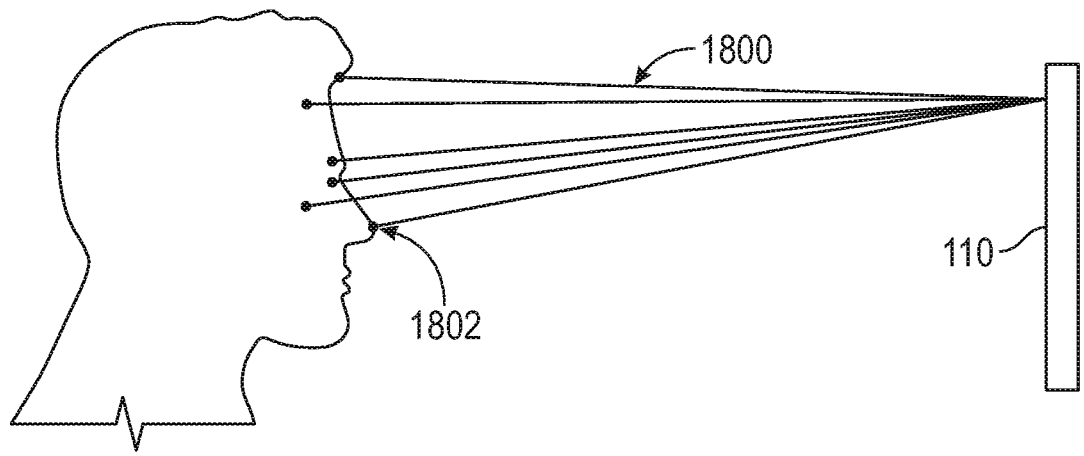
FIG. 18 is a schematic diagram illustrating obtaining absolute measurement locations for a user, according to certain aspects of the disclosure.

FIG. 18 illustrates how user device 110 (e.g., using light source 207) may generate multiple light beams such as infrared beams 1800 that reflect from various incidence locations 1802 on the user's face, in one exemplary implementation for the three-dimensional sensor 209 of FIG. 1. Each beam 1800 generates a spot at the incidence location 1802 with a size and a distortion that is determined by the distance to that location and the shape of the surface at that location. Using the known beam sizes for beams 1800, and an infrared image of the spots captured by sensor 209 (implemented as an infrared sensor in this example), the distances to each incidence location 1802 can be determined. Each incidence location 1802 may represent a measurement point absolute three-dimensional location 211.

Figure 19:
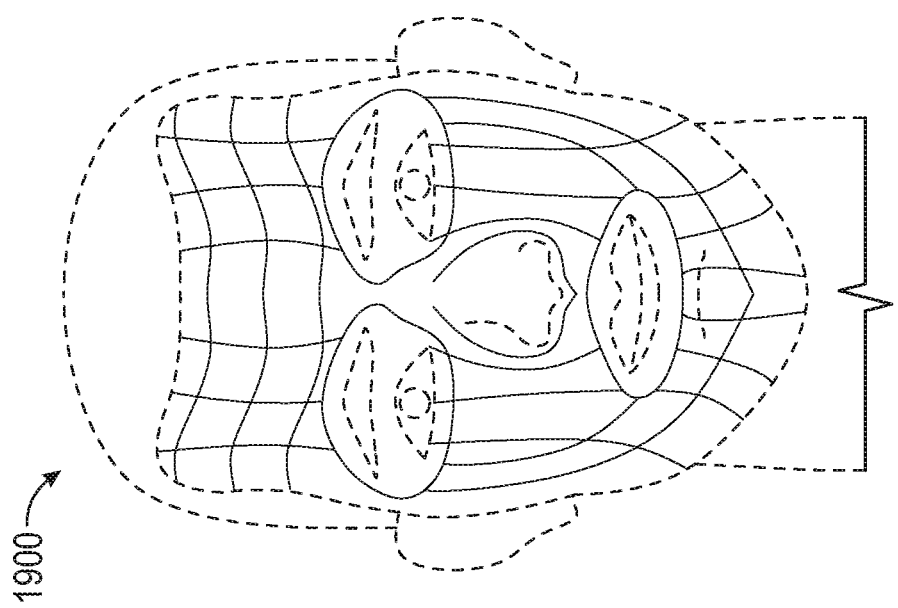
FIG. 19 is a schematic diagram illustrating a two-dimensional rendering of a three-dimensional model of a user, according to certain aspects of the disclosure.

FIG. 19 illustrates a two dimensional rendering 1900 of three-dimensional model 213 of the user (e.g., at the time of capture of image 200) based on the measurement point absolute three-dimensional locations 211. Rendering 1900 may be generated by drawing points and/or lines defined by reference points and/or mathematical functions connecting the reference points that define the model. The model may be stored by storing the reference points, mathematical functions, parameter values for the mathematical functions, and/or other model data, whether or not the model is ever rendered for viewing. The model itself can be intersected with the three-dimensional model of spectacles 300 without rendering of either model.

Figure 20:
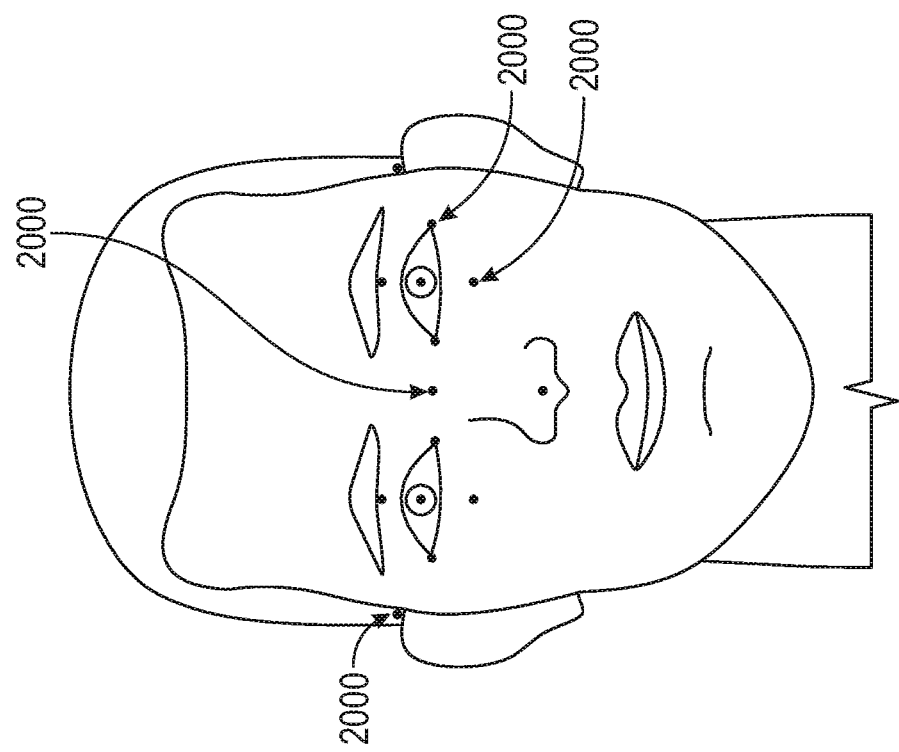
FIG. 20 is a schematic diagram illustrating examples of facial landmark absolute locations for a user, according to certain aspects of the disclosure.

FIG. 20 illustrates representations 2000 of various facial landmark absolute locations 215. The facial landmark absolute locations 215 may be a selected subset of measurement point absolute three-dimensional locations 211 at various facial landmarks, may be averaged or interpolated from two or more of measurement point absolute three-dimensional locations 211, or may be derived or extracted from three-dimensional model 213. In some scenarios in which facial landmark absolute locations 215 are derived directly (e.g., via averaging, interpolation, or other combinations) from measurement point absolute three-dimensional locations 211, three-dimensional model 213 may be generated based on facial landmark absolute locations 215 as input data points. Although FIG. 20 includes representations of nine facial landmark locations, it should be appreciated that more or fewer facial landmark locations can be used in the fitting and/or VTO operations described herein. Facial landmarks for which absolute three-dimensional locations can be determined include, but are not limited to, the sellion, endocanthion, exocanthion, tragion, zygion, otobasion superius, orbitale superius, palpebrale superius, palpebrale inferius, center point of the pupil, glabella, frontotemporale, maxillofrontalle, orbitale, tragion, nasion, pronasale, and menton.

Hardware Overview

Figure 21:
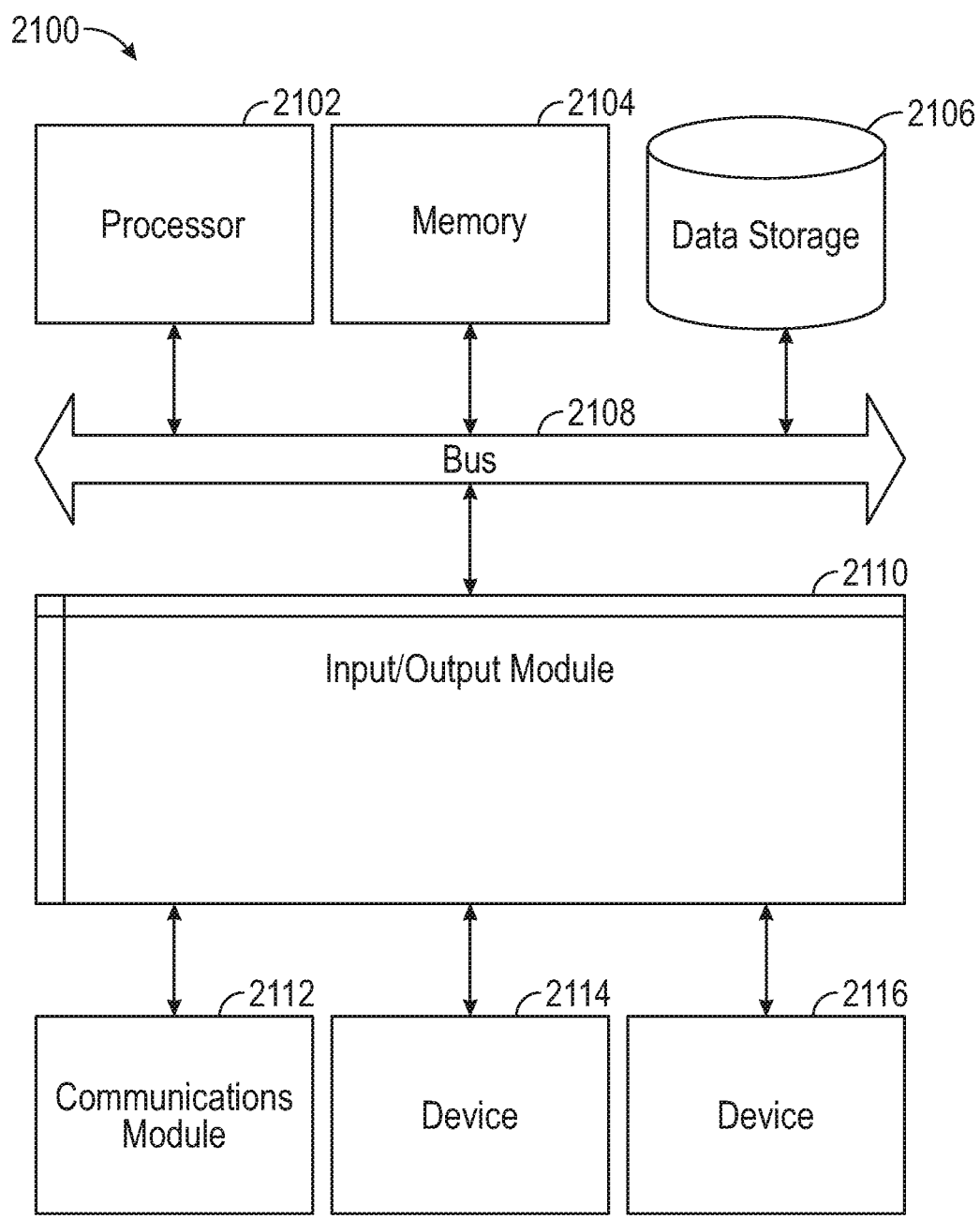
FIG. 21 is a block diagram illustrating an example computer system with which the user device, fitting server, and/or third-party server of FIG. 1 can be implemented, according to certain aspects of the disclosure.

FIG. 21 is a block diagram illustrating an exemplary computer system 2100 with which the user device 110, fitting server(s) 130, and/or third-party server 140 of FIG. 1 can be implemented. In certain aspects, the computer system 2100 may be implemented using hardware or a combination of software and hardware, either in a dedicated server, or integrated into another entity, or distributed across multiple entities.

Computer system 2100 includes a bus 2108 or other communication mechanism for communicating information, and a processor 2102 coupled with bus 2108 for processing information. By way of example, the computer system 2100 may be implemented with one or more processors 2102. Processor 2102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 2100 can include, in addition to hardware, code that creates an execution environment for the computer program in question, e.g., code that constitutes processor firmware, a protocol stack, a database management system, an operating system, or a combination of one or more of them stored in an included memory, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 2108 for storing information and instructions to be executed by processor 2102. The processor 2102 and the memory 2104 can be supplemented by, or incorporated in, special purpose logic circuitry.

The instructions may be stored in the memory 2104 and implemented in one or more computer program products, i.e., one or more modules of computer program instructions encoded on a computer-readable medium for execution by, or to control the operation of, the computer system 2100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 2104 may also be used for storing temporary variable or other intermediate information during execution of instructions to be executed by processor 2102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 2100 further includes a data storage device 2106 such as a magnetic disk or optical disk, coupled to bus 2108 for storing information and instructions. Computer system 2100 may be coupled via input/output module 2110 to various devices. The input/output module 2110 can be any input/output module. Exemplary input/output modules 2110 include data ports such as USB ports. The input/output module 2110 is configured to connect to a communications module 2112. Exemplary communications modules 2112 include networking interface cards, such as Ethernet cards and modems. In certain aspects, the input/output module 2110 is configured to connect to a plurality of devices, such as an input device 2114 and/or an output device 2116. Exemplary input devices 2114 include a keyboard and a pointing device (e.g., a mouse or a trackball), by which a user can provide input to the computer system 2100. Other kinds of input devices 2114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 2116 include display devices, such as an LCD (liquid crystal display) or light-emitting diode (LED) display, for displaying information to the user.

According to one aspect of the present disclosure, user device 110, fitting servers 130, and/or third-party server 140 can be implemented using a computer system 2100 in response to processor 2102 executing one or more sequences of one or more instructions contained in memory 2104. Such instructions may be read into memory 2104 from another machine-readable medium, such as data storage device 2106. Execution of the sequences of instructions contained in main memory 2104 causes processor 2102 to perform the process steps described herein. One or more processors in a multi-processing arrangement may also be employed to execute the sequences of instructions contained in memory 2104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 2100 can include clients and servers. A client and server are generally remote from each other and typically interact through a communication network. The relationship of client and server arises by virtue of computer programs running on the respective computers and having a client-server relationship to each other. Computer system 2100 can be, for example, and without limitation, a desktop computer, laptop computer, or tablet computer. Computer system 2100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 2102 for execution. Such a medium may take many forms, including, but not limited to, non-volatile media, volatile media, and transmission media. Non-volatile media include, for example, optical or magnetic disks, such as data storage device 2106. Volatile media include dynamic memory, such as memory 2104. Transmission media include coaxial cables, copper wire, and fiber optics, including the wires that comprise bus 2108. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
capturing an image of a face of a user;
obtaining a three-dimensional model of the user at a time of capture of the image;
obtaining a three-dimensional model of a pair of spectacles;
determining a size and a position for a virtual representation of the spectacles based on the image, the three-dimensional model of the user at the time of capture of the image, and the three-dimensional model of the pair of spectacles;
displaying the virtual representation of the spectacles, with the determined size and at the determined position, overlaid on the image of the face of the user;
determining fit information for the pair of spectacles based on the three-dimensional model of the user at the time of capture of the image and the three-dimensional model of the pair of spectacles;
providing, for display, a selectable option to view at least one other pair of spectacles having a fit probably that it equal to or higher than a fit probability of the pair of spectacles; and
displaying the fit information along with the virtual representation of the spectacles and the overlaid on the image of the face of the user.

2. The computer-implemented method of claim 1, wherein determining the fit information comprises providing the three-dimensional model of the user at the time of capture of the image, and the three-dimensional model of the pair of spectacles, to a fitting engine implementing a machine-learning model trained to generate the fit information for the pair of spectacles and the user.

3. The computer-implemented method of claim 1, wherein determining the fit information comprises determining a plurality of spatial offsets between a plurality of frame landmark locations associated with the pair of spectacles and a corresponding plurality of facial landmark locations associated with the three-dimensional model of the user.

4. The computer-implemented method of claim 1, wherein the fit information comprises at least one of a text indicator of a fit quality of the pair of spectacles, and a graphical indicator of the fit quality of the pair of spectacles.

5. The computer-implemented method of claim 1, wherein the fit information comprises a fit scale bar, and a marker indicating a fit of the pair of spectacles.

6. The computer-implemented method of claim 5, wherein the fit information further comprises at least one guideline indicating a position of a frame landmark for a frame of the pair of spectacles.

7. The computer-implemented method of claim 1, further comprising providing for display, a selectable option to view at least one of:

another pair of spectacles having a frame that is similar to a frame of the pair of spectacles; and
another pair of spectacles previously selected by another user having a face shape that is similar to a face shape of the user, as determined based on the three-dimensional model of the user at the time of capture of the image.

8. The computer-implemented method of claim 7, wherein the other pair of spectacles having the frame that is similar to the frame of the pair of spectacles has a frame with a common frame style to the frame of the pair of spectacles and a different size from the frame of the pair of spectacles.

9. The computer-implemented method of claim 1, wherein determining the position of the virtual representation comprises performing a plurality of collision detection operations between the three-dimensional model of the user and the three-dimensional model of the pair of spectacles.

10. A computer-implemented method, comprising:
receiving, from a user device at a fitting server, a selection of one or more spectacle frames from a plurality of spectacle frames in a frame database associated with the fitting server;
obtaining, with the fitting server, facial landmark location information for a user of the user device based on sensor data from a sensor of the user device;
obtaining, with the fitting server, frame landmark location information for each of the one or more spectacle frames; and
generating, with a fitting engine of the fitting server, fit information for each of the one or more spectacle frames based on the facial landmark location information and the frame landmark location information; and
providing the fit information for each of the one or more spectacle frames, with the fitting server for display at the user device.

11. The computer-implemented method of claim 10, wherein the fit information comprises a fit probability for each of the one or more spectacle frames.

12. The computer-implemented method of claim 11, further comprising determining, with the fitting engine based on the fit probabilities and a fit threshold, that a first of the one or more spectacle frames is a good fitting frame and a second of the one or more spectacle frames is a poorly fitting frame, and wherein the method further comprises providing, with the fitting server for display at the user device:
a fit indicator for the first of the one or more spectacle frames; and
images and fit information for each of a plurality of other spectacle frames that are each similar to the second of the one or more spectacle frames and that each have a fit probability that is higher than the fit threshold.

13. The computer-implemented method of claim 12, further comprising providing the images and fit information for each of the plurality of other spectacle frames in an order that is determined based on the fit probability and at least one similarity score for each of the plurality of other spectacle frames.

14. A computer-implemented method, comprising:
storing, in a frame database, one of a plurality of size categories for each of a plurality of spectacle frames, each size category corresponding to a range of user measurements;
obtaining, using a sensor of an electronic device, three-dimensional location information for a user;
determining, based on the three-dimensional location information, a user measurement for the user;

identifying a corresponding one of the size categories for the user, based on the user measurement of the user and the ranges of user measurements for the size categories; and providing, for display, information associated with a subset of the plurality of spectacle frames, each of the spectacle frames in the subset having the identified corresponding one of the size categories, wherein the information associated with the subset of the plurality of spectacle frames includes at least one of:
(i) fit information for each of the spectacle frames in the subset, and
(ii) an image and a descriptor for each of the spectacle frames in the subset.

15. The computer-implemented method of claim 14, further comprising, prior to obtaining the three-dimensional location information for the user, providing, for display:
information associated with the plurality of the spectacle frames, and a selectable option to obtain fit information for the plurality of spectacle frames.

16. The computer-implemented method of claim 15, wherein obtaining the three- dimensional location information comprises obtaining the three-dimensional location information responsive to receiving a selection of the selectable option.

17. The computer-implemented method of claim 16, wherein providing the information associated with the subset of the plurality of spectacle frames comprises providing, for display:
an image of each of the frames in the subset; and
a fit probability for each of the frames in the subset.

18. The computer-implemented method of claim 17, further comprising:
receiving a selection of one of the frames in the subset; and
capturing, with a camera of the electronic device, an image of a face of the user;
obtaining a three-dimensional model of the selected one of the frames;
determining a position of a virtual representation of the selected one of the frames based on the image and the three-dimensional location information;
determining a size of the virtual representation of the selected one of the frames based on the image and the three-dimensional location information; and
displaying, with a display of the electronic device, a combined image including the image of the user and the virtual representation of the selected one of the frames with the determined size and the determined position.

19. The computer-implemented method of claim 18, further comprising providing, for display, an indicator of a poor fit of the selected one of the frames.

20. The computer-implemented method of claim 18, further comprising providing, for display, a selectable option to view at least one of:
one or more other frames that are more likely to fit than the selected one of the frames,
one or more other frames that are similar to the selected one of the frames, and
one or more other frames that have been previously selected by other users each having a face shape that is similar to a face shape of the user, as determined based on the three- dimensional location information for the user.

21. The computer-implemented method of claim 14, further comprising:

identifying a bridge style for the user based on the three-dimensional location information; and
displaying a further subset of the subset of the plurality of spectacle frames, each of the spectacle frames in the further subset having the identified bridge style.

22. The computer-implemented method of claim 21, wherein the bridge style is a low bridge style.

23. The computer-implemented method of claim 14, wherein the information associated with the subset of the plurality of spectacle frames comprises fit information for each of the spectacle frames in the subset and the image and the descriptor for each of the spectacle frames in the subset.

24. A computer-implemented method, comprising:
capturing an image of a face of a user;
obtaining a three-dimensional model of the user at a time of capture of the image;
obtaining a three-dimensional model of a pair of spectacles;
determining a size and a position for a virtual representation of the spectacles based on the image, the three-dimensional model of the user at the time of capture of the image, and the three-dimensional model of the pair of spectacles;
displaying the virtual representation of the spectacles, with the determined size and at the determined position, overlaid on the image of the face of the user;
determining fit information for the pair of spectacles based on the three-dimensional model of the user at the time of capture of the image and the three-dimensional model of the pair of spectacles; and
displaying the fit information along with the virtual representation of the spectacles and the overlaid on the image of the face of the user, wherein the fit information include a fit scale bar and a marker indicating a fit of the pair of spectacles.

25. A computer-implemented method, comprising:
capturing an image of a face of a user;
obtaining a three-dimensional model of the user at a time of capture of the image;
obtaining a three-dimensional model of a pair of spectacles;
determining a size and a position for a virtual representation of the spectacles based on the image, the three-dimensional model of the user at the time of capture of the image, and the three-dimensional model of the pair of spectacles;
displaying the virtual representation of the spectacles, with the determined size and at the determined position, overlaid on the image of the face of the user;
determining fit information for the pair of spectacles based on the three-dimensional model of the user at the time of capture of the image and the three-dimensional model of the pair of spectacles;
displaying the fit information along with the virtual representation of the spectacles and the overlaid on the image of the face of the user;
providing, for display, a selectable option to review at least one of:
(i) another pair of spectacles having a frame that is similar to a frame of the pair of spectacles, and
(ii) another pair of spectacles previously selected by another user having a face shape that is similar to a face shape of the user, as determined based on the three- dimensional model of the user at the time of capture of the image,
wherein the another pair of spectacles having the frame that is similar to the frame of the pair of spectacles has a frame with a common frame style to the frame of the pair of spectacles and a different size from the frame of the pair of spectacles.

* * * * *